United States Patent
Pan et al.

(10) Patent No.: US 11,594,748 B2
(45) Date of Patent: Feb. 28, 2023

(54) SETTER PLATES AND MANUFACTURING METHODS FOR CERAMIC-ANODE SOLID OXIDE FUEL CELLS

(71) Applicants: Keji Pan, Ellicott City, MD (US); Sean R. Bishop, Takoma Park, MD (US); Thomas Langdo, Great Falls, VA (US); Bryan M. Blackburn, Bethesda, MD (US)

(72) Inventors: Keji Pan, Ellicott City, MD (US); Sean R. Bishop, Takoma Park, MD (US); Thomas Langdo, Great Falls, VA (US); Bryan M. Blackburn, Bethesda, MD (US)

(73) Assignee: Redox Power Systems, LLC, Beltsville, MD (US)

( * ) Notice: Subject to any disclaimer, the term of this patent is extended or adjusted under 35 U.S.C. 154(b) by 0 days.

(21) Appl. No.: 17/168,357

(22) Filed: Feb. 5, 2021

(65) Prior Publication Data

US 2021/0242482 A1   Aug. 5, 2021

Related U.S. Application Data

(62) Division of application No. 16/135,243, filed on Sep. 19, 2018, now Pat. No. 10,957,933.

(51) Int. Cl.
| | |
|---|---|
| *H01M 8/1226* | (2016.01) |
| *H01M 8/1286* | (2016.01) |
| *H01M 8/1253* | (2016.01) |
| *H01M 8/126* | (2016.01) |
| *H01M 8/12* | (2016.01) |

(52) U.S. Cl.
CPC ........ *H01M 8/1286* (2013.01); *H01M 8/126* (2013.01); *H01M 8/1226* (2013.01); *H01M 8/1253* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 2014/0302420 A1* | 10/2014 | Wachsman | H01M 4/9033 252/519.15 |
| 2017/0237103 A1 | 8/2017 | Choi et al. | |
| 2018/0145337 A1 | 5/2018 | Heo et al. | |
| 2020/0091538 A1 | 3/2020 | Pan et al. | |

FOREIGN PATENT DOCUMENTS

| | | |
|---|---|---|
| JP | 2007-005135 A | 1/2007 |
| JP | 2015-002035 A | 1/2015 |
| KR | 10-2016-0068202 A | 6/2016 |

OTHER PUBLICATIONS

Jin et al. (KR 10-2016-0068202 A, Machine translation). (Year: 2016).*

(Continued)

*Primary Examiner* — Wojciech Haske
(74) *Attorney, Agent, or Firm* — Morgan, Lewis & Bockius LLP

(57) ABSTRACT

In various embodiments, techniques for fabricating solid oxide fuel cells utilize setter plates composed of or having outer surfaces composed of materials unreactive with species found in the layers of the cell.

23 Claims, 9 Drawing Sheets

(56) References Cited

OTHER PUBLICATIONS

International Search Report and the Written Opinion for international application No. PCTiUS2019/050928 dated Jan. 2, 2020 11 pages.
Mercadelli et al ., "Technological Issues in the Manufacturing of Anode-Supported Half-Cells", 2013, ECS Transaction, vol. 57, No. 1, pp. 823-832.

* cited by examiner

SETTER PLATES AND MANUFACTURING METHODS FOR CERAMIC-ANODE SOLID OXIDE FUEL CELLS

RELATED APPLICATIONS

This application is a division of U.S. patent application Ser. No. 16/135,243, filed on Sep. 19, 2018, the entire disclosure of which is hereby incorporated by reference.

GOVERNMENT SUPPORT

This invention was made with United States Government support under Contract No. DE-AR0000494 awarded by the Department of Energy Advanced Projects Research Agency-Energy (ARPA-E). The United States Government has certain rights in the invention.

TECHNICAL FIELD

In various embodiments, the present invention relates to solid-state electrochemical cells such as solid oxide fuel cells, and in particular to fabrication techniques for such cells utilizing setter plates.

BACKGROUND

Solid oxide fuel cells (SOFCs) are highly efficient, environmentally friendly electrochemical devices that are capable of directly converting chemical energy stored in hydrogen or hydrocarbon fuels into electrical energy. SOFCs are therefore an important type of solid-state electrochemical cell. During SOFC operation, oxygen ions migrate from a cathode to an anode through a dense electrolyte. At the anode, the oxygen ions oxidize the fuel, resulting in the generation of electrons that may be directed through an external circuit. SOFCs may be used for, for example, off-grid and portable power generation.

Most state-of-the-art SOFCs use a nickel-based, planar anode-supported cell architecture, which compared to other configurations and materials sets offers a balance between power density, structural strength, and efficiency. Furthermore, most state-of-the-art SOFCs use a yttria-stabilized zirconia (YSZ) electrolyte. However, the use of nickel-based cermet anode supports and YSZ electrolytes often results in less than desirable robustness and creates the risk for long-term reliability issues. During its operational lifetime an SOFC system is expected to operate reliably and with limited degradation in steady-state or transient conditions. Chemical instability at the interfaces is one of the key issues in stationary applications, whereas thermo-mechanical instability has tended to dominate degradation in transportation applications because of frequent thermal cycles. Advancement of key technologies increase the possibility to use SOFC systems for applications such as distributed generation (DG), in which realistic conditions require the ability to regularly experience load following, thermal cycling, and reduction-oxidation ("redox") cycling with minimal degradation.

A primary limitation for Ni-based cermet anodes (e.g., NiO/YSZ) is its poor stability during redox cycling. This instability is due, primarily, to the large volume change and coarsening of the Ni-phase in the cermet anode. For example, Ni can undergo 65-69% volume increase upon re-oxidation to NiO. Such redox cycles can be expected during long-term fuel cell operation due to unexpected fuel supply interruptions, high fuel utilization under high current loads, or gas sealing failures. While major advances have been made in the development of SOFC systems—including innovative approaches to lower the operating temperature and increase power density—reliability issues, robustness, and cost remain an impediment to widespread commercialization.

There are various approaches proposed for solving the redox stability problem, with the most economical methods tending to be through modification of SOFC anode materials. For example, with the use of certain all-ceramic anodes an SOFC can become very robust even in the event of extreme redox cycling conditions such as fuel interruption (i.e., the "reducing" fuel shuts off and is replaced by an oxidizing air environment). An all-ceramic anode also presents the opportunity to fine-tune the material properties of the cell for increased power density and/or efficiency. However, most ceramic-based anode SOFCs are difficult to fabricate using conventional, low cost ceramic processing routes, especially when attempting to make larger planar cells (e.g., larger than 5 cm by 5 cm). Such materials often experience warpage, cracks, or other damage during the elevated temperatures required to produce SOFC materials. Thus, there is a need for improved manufacturing techniques for SOFCs incorporating all-ceramic anodes that minimize or substantially eliminate damage and deformation of the cell materials.

SUMMARY

In accordance with various embodiments of the present invention, cell materials for solid-state electrochemical cells such as SOFCs, such as partial cells that incorporate one or more anode-related layers and a solid electrolyte layer, are fabricated from ceramic powders and sintered while mounted on and/or loaded by setter plates composed of, or having outer surfaces composed of, materials compatible (i.e., unreactive) with the SOFC cell materials. For example, anode layers in accordance with embodiments of the invention may include a ceramic oxide material containing strontium, iron, cobalt, and molybdenum (i.e., "SFCM"). The Co and Mo of SFCM are volatile and may easily migrate during sintering (or "firing") and may react with other nearby materials. In various anode materials in accordance with embodiments of the invention, other dopants or additives such as, for example, Ni, Cr, V, Bi, Li, Na, and/or Cu may also be volatile and deleteriously reactive. Other ceramic anode layers in accordance with embodiments of the invention include vanadium- and sodium-doped strontium niobate (SNNV, i.e., $Sr_{0.2}Na_{0.8}Nb_{1-x}V_xO_{3\pm\delta}$, where $0.1 \leq x \leq 0.3$ and $0 \leq \delta \leq 1.5$), as well as vanadium-doped strontium titanate (SVT, i.e., $Sr_xV_yTi_{1-y}O_{3\pm\delta}$, where $1.0 \geq x \geq 0.8$, $0.1 \leq y \leq 0.4$, and $0 \leq \delta \leq 1.5$), as disclosed in U.S. Pat. No. 9,525,179, filed on Mar. 12, 2014, the entire disclosure of which is incorporated by reference herein. Although SFCM is utilized as an exemplary material in various examples herein, it is understood that other ceramic anode materials (e.g., SNNV, SVT, etc.) are encompassed by embodiments of the invention.

During fabrication processes in accordance with embodiments of the invention, unfired (or "green") SOFC layered structures are disposed on and/or loaded by a setter plate (or simply, "setter") for high-temperature sintering processes during which the ceramic constituents within the green ceramic coalesce (or sinter) to become a solid, consolidated part. Conventional sintering processes utilize alumina ($Al_2O_3$) setter plates, which are inexpensive and have high melting points. However, SFCM structures that contact alumina setter plates react to form compounds such as $Al_2(MoO_4)_3$ and $CoMoO_4$, which degrade SOFC performance or even destroy the SFCM-based cell. Moreover, NiO in Ni-cermets may also react with alumina to form nickel aluminate spinel, which may impact cell performance and decrease manufacturing yield. In addition, SFCM-based SOFC materials may crack and/or become stuck to conventional setter plates during sintering, resulting in damage to the cell materials or rendering the fired materials unsuitable for further processing into fuel cells.

Thus, embodiments of the present invention utilize setter plates that are coated with or entirely composed of materials unreactive with the SOFC materials (e.g., SFCM-based anode materials) that they support and/or contact during sintering steps. In general, setter plates in accordance with embodiments of the invention may include, consist essentially of, or consist of one or more materials utilized to fabricate an SOFC anode and/or solid electrolyte layer, but may also include, consist essentially of, or consist of one or more other unreactive or essentially unreactive materials. For example, setter plates in accordance with embodiments of the invention may include, consist essentially of, or consist of ceria ($Ce_2$) or gadolinium-doped ceria (GDC) (e.g., $Ce_{0.9}Gd_{0.1}O_{1.95}$). The setter plates may either be entirely composed of the unreactive material, or the setter plates may be composed of a different ceramic material (e.g., alumina, YSZ, or silicon carbide) that is coated, at least on the outer surface that faces and/or directly contacts the SOFC material, with the unreactive material. Embodiments of the invention therefore include alumina setter plates that are coated with ceria or GDC, and the SOFC materials fired with such setter plates may be based, at least in part, on doped ceria, GDC, $ZrO_2$, and/or YSZ.

In accordance with some embodiments of the invention, SOFC anode materials and layers are "all-ceramic," i.e., materials that do not reduce to form metal in the reducing fuel environment of the SOFC. In various embodiments, all-ceramic materials are free of nickel, nickel oxide, and other metals not incorporated within a ceramic-phase network. In various embodiments, this is the case up to and after partial-cell (or half-cell) firing during fabrication. Such materials tend to exhibit superior performance and reliability during load following, thermal cycling, and redox cycling. In various embodiments, setter plates are also free of nickel and nickel oxide. In various embodiments, SOFC anode materials may be infiltrated with various catalysts, including Ni, after half-cell firing and before or after cathode layers are added to the SOFC.

SOFC materials and layers, in accordance with embodiments of the invention, are placed upon and/or loaded by setter plates for firing. After firing, the unreactive nature of the setter-plate material enables the separation of substantially the entire cell material or layer from the setter plate(s), i.e., the removal of the entire bulk layer structure without cracking or breaking thereof, and without all or part of the layer structure deleteriously sticking to a setter plate. While firing of various cell layers in accordance with embodiments of the invention may result in creation of visible discoloration or artifacts (e.g., dust or powder) on a setter plate, as long as the bulk of the layer having the desired shape and dimensions may be removed from the setter plate(s) without cracking, adhesion, or damage, this is considered to be separation of "substantially the entire layer" from the setter plate(s).

Various embodiments of the present invention incorporate thin functional layers between the electrolyte and the cathode in order to reduce the interfacial resistance between the electrolyte and the cathode, as disclosed in U.S. patent application Ser. Nos. 15/461,708 and 15/461,709 (the '708 and '709 applications), both filed on Mar. 17, 2017, the entire disclosures of which are incorporated by reference herein. For example, the functional layer may include, consist essentially of, or consist of cobalt oxide mixed with gadolinium-doped ceria (Co-GDC, for example, $Co_3O_4$—$Ce_{0.9}Gd_{0.1}O_{1.95}$) or cobalt oxide mixed with samarium doped ceria (Co-SDC, for example, $Co_3O_4$—$Ce_{0.8}Sm_{0.2}O_{1.9}$), and the functional layer may be disposed and in direct contact with the solid electrolyte and the cathode material.

SOFCs are utilized herein as exemplary devices in descriptions of embodiments of the present invention, but it should be understood that embodiments of the invention also encompass other types of solid-state electrochemical cells. For example, a second type of solid-state electrochemical cell is known as a solid oxide electrolyzer cell (SOEC), which is like a SOFC that runs in reverse. In other words, the SOEC takes electricity as an input to drive the reverse reaction of the SOFC, where water (and/or carbon dioxide) is converted into hydrogen (and/or carbon monoxide) and oxygen. The SOEC is an electrolytic cell involving the transformation of electrical energy into chemical energy, whereas the SOFC is a galvanic cell involving the transformation of chemical energy into electrical energy. Like the SOFC, the SOEC typically operates between 500° C. and 800° C. and is a layered structure including, consisting essentially of, or consisting of a solid oxide (ceramic) electrolyte, a fuel electrode, and an oxygen electrode. The most common electrolyte of SOECs, similar to SOFCs, is a dense ionic conductor that includes yttria stabilized zirconia (YSZ). Some other choices are scandia stabilized zirconia (ScSZ), doped ceria-based electrolytes, or lanthanum gallate materials. The most common fuel electrode material is a Ni-YSZ cermet. Perovskite-type lanthanum strontium manganese (LSM) is the most common oxygen electrode material though other cathode materials are possible. SOECs may be planar or tubular just like the SOFC. Furthermore, the SOEC may in certain cases be exactly the same as the SOFC and used in both SOFC mode and SOEC mode. This is known as a reversible or regenerative fuel cell.

A third type of solid-state electrochemical cell is known as solid oxide membrane (SOM) reactor, or an electrocatalytic reactor. The reactors have two chambers that are separated by a solid oxide, gas-tight ceramic electrolyte or membrane that is capable of transporting oxide ions (and/or protons) at elevated temperatures (typically between 600° C. and 1,000° C.). Such electrochemical cells can operate in electrolytic mode to convert input feedstock chemicals (e.g., $CH_4$) into other higher value chemicals (e.g., ethylene) and/or reactions can be driven through pressure or concentration gradients on either side of the membrane. Catalyst in each chamber can increase selectivity to a product by offering reaction sites and/or creating reaction pathways that are more favorable to certain products than others. SOM reactors have also been used to drive partial oxidation reactions of methane to form syngas (mostly hydrogen and carbon monoxide), oxidative coupling of methane (OCM) to form ethane and ethylene, and even the generation of high-purity oxygen from air. SOM reactors may be planar or tubular just like the SOFC.

In an aspect, embodiments of the invention feature a method of fabricating a solid oxide fuel cell. A layered structure is provided. The layered structure includes, consists essentially of, or consists of (i) a ceramic anode (e.g., a ceramic anode support layer and a ceramic anode functional layer disposed over the anode support layer), and (ii)

a solid electrolyte layer disposed over the anode (e.g., over the anode functional layer). The layered structure is disposed or positioned on a first setter plate. The first setter plate has a top surface (i) in contact with the anode (e.g., with the anode support layer) and (ii) including, consisting essentially of, or consisting of ceria and/or doped ceria. One or more additional surfaces of the first setter plate (e.g., the bottom surface and/or one or more side surfaces spanning the top and bottom surfaces) may include, consist essentially of, or consist of ceria and/or doped ceria. The layered structure is sintered. Substantially the entire, or the entire, sintered layered structure is separated from the first setter plate after sintering.

Embodiments of the invention may include one or more of the following in any of a variety of combinations. A cathode layer (e.g., a ceramic cathode layer) may be formed (e.g., deposited) over the electrolyte layer before sintering (e.g., before the first setter plate is positioned) or after sintering (e.g., after the sintered layered structure is separated from the first setter plate). The cathode layer may include, consist essentially of, or consist of a mixture of samarium strontium cobaltite and doped ceria. A second setter plate may be disposed or positioned on the layered structure before sintering. The second setter plate may have a bottom surface including, consisting essentially of, or consisting of ceria and/or doped ceria. The bottom surface of the second setter plate may be in contact with the uppermost layer of the layered structure (e.g., the electrolyte or a cathode layer). One or more additional surfaces of the second setter plate (e.g., the top surface and/or one or more side surfaces spanning the top and bottom surfaces) may include, consist essentially of, or consist of ceria and/or doped ceria. After the layered structure is sintered, substantially the entire layered structure may be separated from the second setter plate. The bottom surface of the second setter plate may include, consist essentially of, or consist of ceria doped with Gd, Y, La, Pr, Sm, and/or Nd. The second setter plate may include, consist essentially of, or consist of a ceramic setter material coated with a layer of material different from the ceramic setter material. The ceramic setter material may include, consist essentially of, or consist of alumina, and/or the layer of material different from the ceramic setter material may include, consist essentially of, or consist of ceria and/or doped ceria. The second setter plate (i.e., the entire plate) may include, consist essentially of, or consist of ceria and/or doped ceria. A weight of the second setter plate may range between approximately 0.5 g/cm$^2$ and approximately 3 g/cm$^2$. A loading applied to the layered structure during sintering, including any weight of the second setter plate applied to the layered structure, may range between approximately 0.5 g/cm$^2$ and approximately 3 g/cm$^2$. The bottom surface of the second setter plate may further include, mixed with the ceria and/or doped ceria, one or more volatile species selected from the list consisting of Co, Mo, Ni, Cr, V, Bi, Li, Na, and Cu.

The top surface of the first setter plate may include, consist essentially of, or consist of ceria doped with Gd, Y, La, Pr, Sm, and/or Nd. The first setter plate may include, consist essentially of, or consist of a ceramic setter material coated with a layer of material different from the ceramic setter material. The ceramic setter material may include, consist essentially of, or consist of alumina, and/or the layer of material different from the ceramic setter material may include, consist essentially of, or consist of ceria and/or doped ceria. The first setter plate (i.e., the entire plate) may include, consist essentially of, or consist of ceria and/or doped ceria. The top surface of the first setter plate may further include, mixed with the ceria and/or doped ceria, one or more volatile species selected from the list consisting of Co, Mo, Ni, Cr, V, Bi, Li, Na, and Cu. The anode and/or anode functional layer may include, consist essentially of, or consist of a mixture of doped ceria with a ceramic oxide material containing strontium, iron, cobalt, and molybdenum. The electrolyte layer may include, consist essentially of, or consist of doped ceria (e.g., ceria doped with Gd, Y, La, Pr, Sm, and/or Nd). The method may include, prior to disposing the layered structure on the first setter plate, (i) coating a first plate with a layer of ceria and/or doped ceria, and (ii) sintering the first plate at a temperature above 500° C. (e.g., above 1000° C.) to form the first setter plate. The temperature at which the first plate is sintered may be higher than a temperature (e.g., a maximum temperature) at which the layered structure is sintered.

In another aspect, embodiments of the invention feature a method of fabricating a solid oxide fuel cell. A layered structure is provided. The layered structure includes, consists essentially of, or consists of (i) a ceramic anode (e.g., a ceramic anode support layer and a ceramic anode functional layer disposed over the anode support layer), and (ii) a solid electrolyte layer disposed over the anode (e.g., over the anode functional layer). The layered structure is disposed or positioned on a first setter plate. The first setter plate has a top surface (i) in contact with the anode (e.g., with the anode support layer) and (ii) including, consisting essentially of, or consisting of ceria and/or doped ceria. One or more additional surfaces of the first setter plate (e.g., the bottom surface and/or one or more side surfaces spanning the top and bottom surfaces) may include, consist essentially of, or consist of ceria and/or doped ceria. A second setter plate is disposed or positioned on the layered structure. The second setter plate has a bottom surface including, consisting essentially of, or consisting of ceria and/or doped ceria. The bottom surface of the second setter plate is in contact with the uppermost layer of the layered structure (e.g., the electrolyte or a cathode layer). One or more additional surfaces of the second setter plate (e.g., the top surface and/or one or more side surfaces spanning the top and bottom surfaces) may include, consist essentially of, or consist of ceria and/or doped ceria. The layered structure is sintered. Substantially the entire, or the entire, sintered layered structure is separated from the first and second setter plates after sintering.

Embodiments of the invention may include one or more of the following in any of a variety of combinations. A cathode layer (e.g., a ceramic cathode layer) may be formed (e.g., deposited) over the electrolyte layer before sintering (e.g., before one or both setter plates are positioned) or after sintering (e.g., after the sintered layered structure is separated from the first and second setter plates). The cathode layer may include, consist essentially of, or consist of a mixture of samarium strontium cobaltite and doped ceria. The first setter plate and/or the second setter plate may include, consist essentially of, or consist of a ceramic setter material coated with a layer of ceria and/or doped ceria. The doped ceria may include, consist essentially of, or consist of ceria doped with Gd, Y, La, Pr, Sm, and/or Nd. The ceramic setter material may include, consist essentially of, or consist of alumina. The first setter plate and/or the second setter plate (i.e., the entire plate(s)) may include, consist essentially of, or consist of ceria and/or doped ceria. The anode and/or anode support layer may include, consist essentially of, or consist of a mixture of ceria with a ceramic oxide material containing strontium, iron, cobalt, and molybdenum. The anode and/or anode functional layer may include, consist essentially of, or consist of a mixture of doped ceria with a ceramic oxide material containing strontium, iron, cobalt, and molybdenum. The electrolyte layer may include, consist essentially of, or consist of doped ceria. A weight of the second setter plate may range between approximately 0.5 g/cm² and approximately 3 g/cm². A loading applied to the layered structure during sintering, including any weight of the second setter plate applied to the layered structure, may range between approximately 0.5 g/cm² and approximately 3 g/cm². The method may include, prior to disposing the layered structure on the first setter plate and disposing the second setter plate on the layered structure, (i) coating a first plate with a layer of ceria and/or doped ceria, (ii) coating a second plate with a layer of ceria and/or doped ceria, (iii) sintering the first plate at a temperature above 500° C. (e.g., above 1000° C.) to form the first setter plate, and (iv) sintering the second plate at a temperature above 500° C. (e.g., above 1000° C.) to form the second setter plate. The first temperature and/or the second temperature may be higher than a temperature (e.g., a maximum temperature) at which the layered structure is sintered.

In yet another aspect, embodiments of the invention feature a method of fabricating a solid oxide fuel cell. A layered structure is provided. The layered structure includes, consists essentially of, or consists of (i) a ceramic anode (e.g., a ceramic anode support layer and a ceramic anode functional layer disposed over the anode support layer), and (ii) a solid electrolyte layer disposed over the anode (e.g., over the anode functional layer). The anode and/or anode support layer includes, consists essentially of, or consists of a mixture of a first ceramic material with a ceramic oxide material containing strontium, iron, cobalt, and molybdenum. The anode and/or anode functional layer includes, consists essentially of, or consists of a mixture of a second ceramic material with the ceramic oxide material containing strontium, iron, cobalt, and molybdenum. The electrolyte layer includes, consists essentially of, or consists of a third ceramic material. The layered structure is disposed or positioned on a first setter plate. The first setter plate has a top surface (i) in contact with the anode (e.g., with the anode support layer) and (ii) including, consisting essentially of, or consisting of the first ceramic material, the second ceramic material, and/or the third ceramic material. One or more additional surfaces of the first setter plate (e.g., the bottom surface and/or one or more side surfaces spanning the top and bottom surfaces) may include, consist essentially of, or consist of the first ceramic material, the second ceramic material, and/or the third ceramic material. A second setter plate is disposed or positioned on the layered structure. The second setter plate has a bottom surface including, consisting essentially of, or consisting of the first ceramic material, the second ceramic material, and/or the third ceramic material. The bottom surface of the second setter plate is in contact with the uppermost layer of the layered structure (e.g., the electrolyte or a cathode layer). One or more additional surfaces of the second setter plate (e.g., the top surface and/or one or more side surfaces spanning the top and bottom surfaces) may include, consist essentially of, or consist of the first ceramic material, the second ceramic material, and/or the third ceramic material. The layered structure is sintered. Substantially the entire, or the entire, sintered layered structure is separated from the first and second setter plates after sintering.

Embodiments of the invention may include one or more of the following in any of a variety of combinations. A cathode layer (e.g., a ceramic cathode layer) may be formed (e.g., deposited) over the electrolyte layer before sintering (e.g., before one or both setter plates are positioned) or after sintering (e.g., after the sintered layered structure is separated from the first and second setter plates). The cathode layer may include, consist essentially of, or consist of a mixture of samarium strontium cobaltite and doped ceria. The first ceramic material may include, consist essentially of, or consist of ceria. The second ceramic material may include, consist essentially of, or consist of doped ceria. The third ceramic material may include, consist essentially of, or consist of doped ceria. The first ceramic material may include, consist essentially of, or consist of ceria, and each of the second and third ceramic materials may include, consist essentially of, or consist of doped ceria. The doped ceria may include, consist essentially of, or consist of ceria doped with Gd, Y, La, Pr, Sm, and/or Nd. The first setter plate and/or the second setter plate may include, consist essentially of, or consist of a ceramic setter material coated with a layer of the first ceramic material, the second ceramic material, and/or the third ceramic material. The ceramic setter material may include, consist essentially of, or consist of alumina. The first setter plate and/or the second setter plate (i.e., the entire plate(s)) may include, consist essentially of, or consist of the first ceramic material, the second ceramic material, and/or the third ceramic material. The method may include, prior to disposing the layered structure on the first setter plate and disposing the second setter plate on the layered structure, (i) coating a first plate with a layer of the first ceramic material, the second ceramic material, and/or the third ceramic material, (ii) coating a second plate with a layer of the first ceramic material, the second ceramic material, and/or the third ceramic material, (iii) sintering the first plate at a temperature above 500° C. (e.g., above 1000° C.) to form the first setter plate, and (iv) sintering the second plate at a temperature above 500° C. (e.g., above 1000° C.) to form the second setter plate. The first temperature and/or the second temperature may be higher than a temperature (e.g., a maximum temperature) at which the layered structure is sintered.

Aspects of the invention include sintered layered structures fabricated according to any of the techniques described above.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean±10%, and in some embodiments, ±5%. The term "consists essentially of" means excluding other materials that contribute to function, unless otherwise defined herein. Nonetheless, such other materials may be present, collectively or individually, in trace amounts. For example, a structure consisting essentially of multiple metals will generally include only those metals and only unintentional impurities (which may be metallic or non-metallic) that may be detectable via chemical analysis but do not contribute to function.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
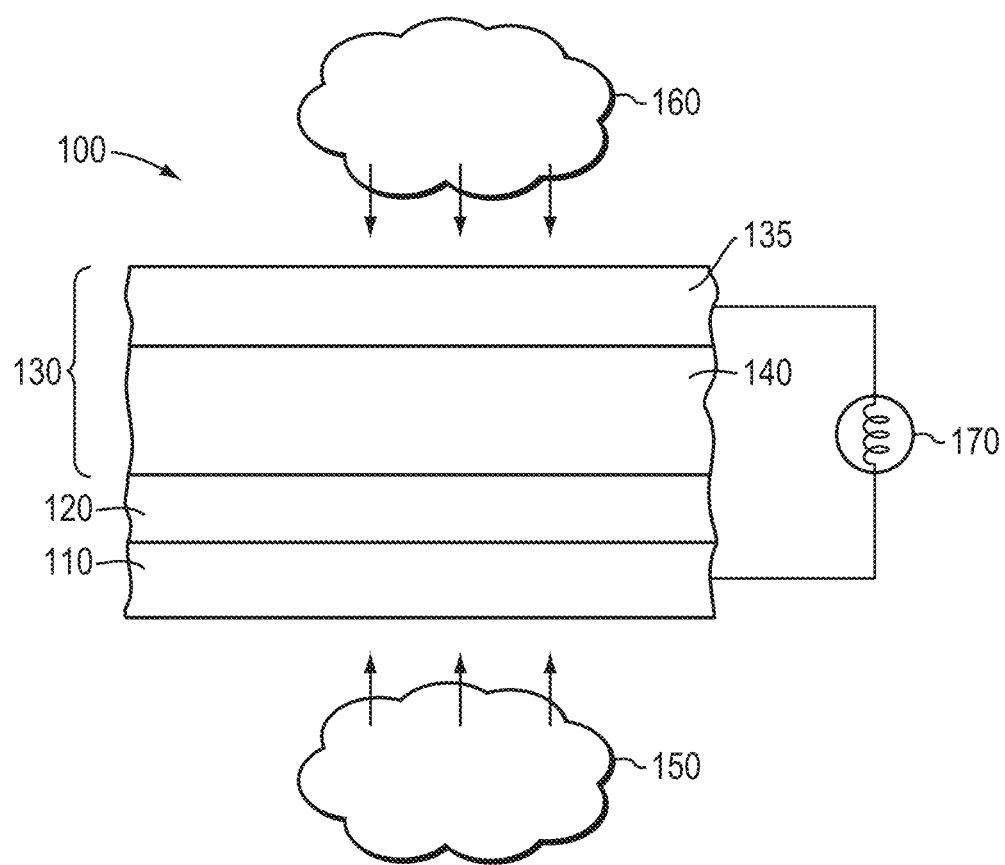
FIG. 1 is a schematic diagram of solid oxide fuel cell in accordance with various embodiments of the invention.

FIG. 1 schematically depicts a SOFC 100 in accordance with embodiments of the present invention. As shown, the SOFC 100 features a cathode 110, a solid electrolyte 120, and an anode 130. As shown, the anode 130 may include, consist essentially of, or consist of an anode support (or anode support layer) 135 and an anode functional layer 140. During operation of SOFC 100, oxygen from an oxygen source 150 (e.g., air) is ionized by the cathode 110. The resulting oxygen ions are conducted from the cathode 110, through the solid electrolyte 120, to the anode 130. At the anode 130, the oxygen ions are reacted with a hydrogen-containing fuel 160 to produce electricity. As shown, the generated electricity may be flowed through an external load 170 and back to the cathode 110 to support further ionization at the cathode 110. The electrochemical reaction may also generate by-products such as, e.g., water and carbon dioxide at the anode 130. The hydrogen-containing fuel 160 may include, consist essentially of, or consist of, for example, hydrogen gas and/or a hydrocarbon fuel such as natural gas, propane, gasoline, diesel, or biofuel. In various embodiments, the hydrogen-containing fuel 160 may include, consist essentially of, or consist of a mixture of $H_2$, CO, $H_2O$, $CO_2$, and $CH_4$ (e.g., a syngas). For increased power generation, multiple SOFCs 100 may be linked together in a stacked structure. While FIG. 1 depicts SOFC 100 in a planar configuration, in various embodiments of the invention the SOFC may be arranged in a concentric tubular configuration. For example, the oxygen source 150 may be flowed through a tubular cathode 110, around which are disposed tubular electrolyte 120 and anode 130, while the hydrogen-containing fuel 160 may be flowed around the outside of the anode 130.

In various embodiments of the invention, the cathode 110 includes, consists essentially of, or consists of, for example, one or more of lanthanum strontium cobalt ferrite (LSCF) (e.g., $La_{0.6}Sr_{0.4}Co_{0.8}Fe_{0.2}O_{3-\delta}$), lanthanum strontium manganite (LSM) (e.g., $La_{0.8}Sr_{0.2}MnO_{3-\delta}$), lanthanum strontium cobaltite (LSC) (e.g., $La_{0.6}Sr_{0.4}CoO_{3-\delta}$), barium strontium cobalt ferrite (BCSF) (e.g., $Ba_{0.5}Sr_{0.5}Co_{0.8}Fe_{0.2}O_{3-\delta}$), samarium strontium cobaltite (SSC) (e.g., $Sm_{0.5}Sr_{0.5}CoO_{3-\delta}$), and/or doped ceria with dopant concentrations ranging from 5 to 30 mol % (or ranging from 10 to 20 mol %), for example samarium-doped ceria (SDC) (e.g., $Co$—$Ce_{0.8}Sm_{0.2}O_{1.9}$), gadolinium-doped ceria (GDC) (e.g., $Co$—$Ce_{0.9}Gd_{0.1}O_{1.95}$), or ceria doped with any one or more of Y, La, Pr, Sm, or Nd.

For example, the cathode 110 may include, consist essentially of, or consist of a mixture of SSC and GDC, e.g., in a ratio of 3:7 to 7:3 by mass. The cathode 110 may be both an ionic conductor and an electronic conductor, and the cathode 110 may be porous to promote oxygen access for ionization and to provide electrochemically active triple phase boundaries (TPBs) where the electrolyte 120, air, and cathode 110 meet. For example, the cathode 110 may have a porosity ranging from approximately 30% to approximately 60%.

In general, the solid electrolyte 120 is a dense (e.g., ceramic) material that conducts oxygen ions while minimizing electronic conduction therewithin in order to prevent current leakage and corresponding electrical losses. The thickness of the solid electrolyte 120 may range from, for example, approximately 1 µm to approximately 40 µm, or approximately 5 µm to approximately 40 µm, or even from approximately 10 µm to approximately 30 µm. In various embodiments of the invention, the solid electrolyte 120 includes, consists essentially of, or consists of, for example, SDC or GDC. Such solid electrolytes 120 may have dopant concentrations ranging from, for example, approximately 5 to approximately 30 mol %, or from approximately 10 to approximately 20 mol %. In various embodiments, the solid electrolyte 120 may include, consist essentially of, or consist of one or more doped cerias such as yttria-doped ceria (YDC, e.g., $Y_{0.1}Ce_{0.9}O_{1.95}$), neodymium-doped ceria (NdDC, e.g., $Nd_{0.1}Ce_{0.9}O_{1.95}$), praseodymium-doped ceria (PrDC, e.g., $Pr_{0.1}Ce_{0.9}O_{1.95}$), and/or lanthanum-doped ceria (LaDC, e.g., $La_{0.1}Ce_{0.9}O_{1.95}$). Such solid electrolytes 120 may have dopant concentrations ranging from, for example, approximately 5 to approximately 30 mol %, or from approximately 10 to approximately 20 mol %.

Like the cathode 110, the anode 130 is preferably a porous conductor of at least electrons and, in some embodiments, both ions and electrons in order to provide a conduit for electrons to leave the cell and enter an external circuit (and in some embodiments to additionally promote the electrochemical reaction). In various embodiments of the invention, all or a portion of the anode 130 includes, consists essentially of, or consists of, for example, a ceramic oxide material containing strontium, iron, cobalt, and molybdenum (i.e., SFCM), e.g., $SrFe_{0.1}Co_{0.45}Mo_{0.45}O_3$, $SrFe_{0.2}Co_{0.4}Mo_{0.4}O_3$, $SrFe_{0.34}Co_{0.33}Mo_{0.33}O_3$, or $SrFe_{0.5}Co_{0.25}Mo_{0.25}O_3$. In other embodiments, all or a portion of the anode 130 includes, consists essentially of, or consists of, e.g., vanadium- and sodium-doped strontium niobate (SNNV, i.e., $Sr_{0.2}Na_{0.8}Nb_{1-x}V_xO_{3\pm\delta}$, where $0.1 \leq x \leq 0.3$ and $0 \leq \delta \leq 1.5$), or vanadium-doped strontium titanate (SVT, i.e., SVT, i.e., $Sr_xV_yTi_{1-y}O_{3\pm\delta}$, where $1.0 \geq x \geq 0.8$, $0.1 \leq y \leq 0.4$, and $0 \leq \delta \leq 1.5$). All or a portion of the anode 130 may include, consist essentially of, or consist of a mixture of SFCM and another material such as GDC. For example, as shown in FIG. 1, the anode 130 may be composed of an anode support 135 and an anode functional layer 140. The anode support 135, which supports the cell 100 and allows gas (i.e., fuel) access to the functional layer 140, may include, consist essentially of, or consist of, e.g., a mixture of SFCM and GDC. The anode functional layer 140, which promotes electrocatalytic activity in the anode 130, may include, consist essentially of, or consist of, e.g., a mixture of SFCM and GDC. The anode functional layer 140, in various embodiments, is composed of particles having a smaller particle size than those of the anode support 135. In various embodiments, the anode 130 (e.g., the anode support 135 and/or the anode functional layer 140) is free of nickel, nickel oxide, and/or yttria.

Figure 2:
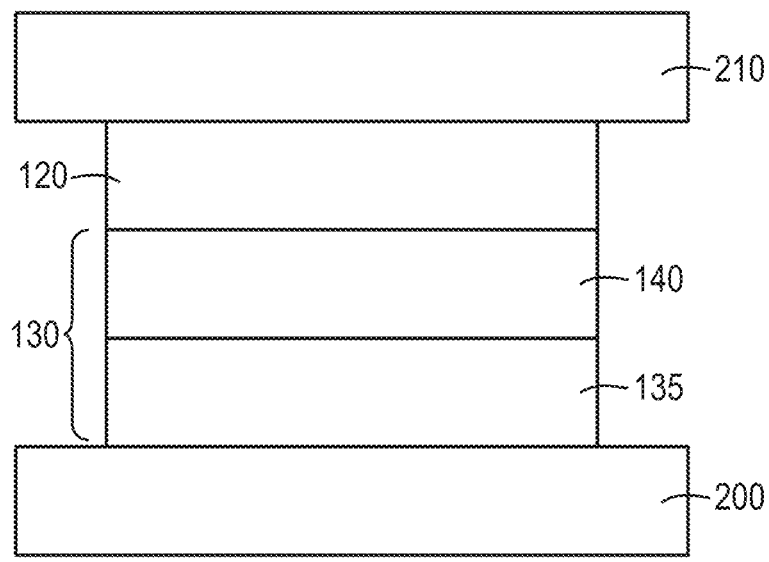
FIG. 2 is a schematic diagram of a partial solid oxide fuel cell in a firing configuration between two setter plates in accordance with various embodiments of the invention.

Various techniques may be utilized for the fabrication of the SOFC 100 and its constituent layers in accordance with embodiments of the present invention. In various embodiments, a partial cell structure is assembled and then fired (e.g., in a furnace or kiln) using one or more setter plates. For example, as shown in FIG. 2, a partial cell structure including, consisting essentially of, or consisting of the anode 130 (e.g., anode support 135 and anode functional layer 140) and the electrolyte 120 in green, unfired form may be assembled and placed between a bottom setter plate 200 and a top setter plate 210. In various embodiments, the top setter plate 210 may be absent during all or a portion of the firing sequence of the partial cell structure. Setters utilized with tubular SOFCs (or portions thereof) may have one or more channels or grooves to support or cradle the SOFC. Setter coatings in accordance with embodiments of the invention may be disposed at least on the surface(s) of the setters that contact the SOFC during firing.

The fabrication of one or more, or even all, of the electrolyte layer 120, the anode support layer 135, and the anode functional layer 140 may include tape casting. For example, the ceramic powders constituting each of the layers may be individually mixed and tape cast (e.g., onto a polymeric support (e.g., polyethylene terephthalate or biaxially-oriented polyethylene terephthalate)) and dried before being cut into sheets. The tape cast layers may include one or more organic (e.g., polymeric) binders (e.g., polymethylmethacrylate (PMMA), e.g., in particulate or bead form. The sheets may be stacked in the desired configuration and "tacked," i.e., pressed together under low pressure so that the resulting stacked structure may be handled. The stacked structure may subsequently be laminated together by, e.g., warm isostatic pressing (at a temperature ranging from, e.g., approximately 40° C. to approximately 200° C.), prior to firing.

Once arranged as depicted in FIG. 2, the partial cell structure is fired in order to burn out any organics in the layers and to sinter the layers for densification. Although FIG. 2 depicts the layers with the anode 130 facing down toward and contacting setter plate 200, embodiments of the invention include configurations in which the layer structure is flipped and electrolyte 120 (or cathode 110, if present) faces down toward (and/or contacts) setter plate 200. In various embodiments, the layers are fired at a maximum temperature ranging from approximately 1000° C. to approximately 1350° C., or even a maximum temperature ranging from approximately 1000° C. to approximately 1500° C., for a time period ranging from approximately 1 hour to approximately 6 hours. In various embodiments, the layers may be initially fired at one or more intermediate temperatures lower than the maximum temperature in order to burn out organic binders. For example, in an exemplary firing sequence, the layers are fired at a first temperature ranging from approximately 110° C. to approximately 220° C. (e.g., approximately 160° C.) for a first time period ranging from approximately 0.5 hour to approximately 5 hours (e.g., approximately 3 hours), at a second temperature ranging from approximately 250° C. to approximately 500° C. (e.g., approximately 400° C.) for a second time period ranging from approximately 0.5 hour to approximately 3 hours (e.g., approximately 2 hours), and then fired at the maximum temperature as detailed above. Between firing stages, the temperature within the kiln or furnace may be ramped at a rate of, for example, 1-15° C./min.

During firing, the ambient atmosphere within the kiln or furnace may be, for example, forced or stagnant air. In other embodiments, the atmosphere within the kiln or furnace may include, consist essentially of, or consist of nitrogen and/or argon containing approximately 1% to approximately 50% oxygen. In yet other embodiments, the atmosphere within the kiln or furnace may include, consist essentially of, or consist of hydrogen (up to approximately 100/6), oxygen (up to approximately 100%), or approximately 1% to approximately 50% hydrogen with the balance being nitrogen and/or argon. The atmosphere may flow at a rate of, e.g., approximately 0.1 to approximately 10 cubic feet per minute.

In various embodiments, the setter plates 200, 210 have areal dimensions at least as large as the material or partial cell structure being fired therebetween. As shown in FIG. 2, one or both of the setter plates 200, 210 may have a larger areal dimension such that the setter plate overhangs or underhangs the material or partial cell structure being fired. In various embodiments, the setter plate 200 has the same area as or overhangs the material or partial cell structure being fired. In other embodiments, the setter plate 200 has the same area as the material or partial cell structure being fired, while the setter plate 210 overhangs the material or partial cell structure being fired. In another embodiments, both of the setter plates 200, 210 have the same area as the material or partial cell structure being fired.

The setter plates 200, 210 are coated with or entirely composed of materials unreactive with the SOFC materials (e.g., SFCM-based anode materials) that they support and/or contact during sintering steps. For example, one or both of the setter plates 200, 210 may include, consist essentially of, or consist of ceria. In general, one or both of the setter plates 200, 210 may include, consist essentially of, or consist of one or more materials utilized to fabricate the electrolyte layer 120, the anode support layer 135, and the anode functional layer 140. For example, one or both of the setter plates 200, 210 may include, consist essentially of, or consist of GDC. One or both of the setter plates 200, 210 may either be entirely composed of the unreactive material, and/or one or both of the setter plates 200, 210 may be composed of a different ceramic material (e.g., alumina, YSZ, or silicon carbide) that is coated, at least on the outer surface that faces and/or directly contacts the partial cell, with the unreactive material. Embodiments of the invention therefore include alumina setter plates 200, 210 that are coated with ceria or GDC. For example, embodiments of the invention feature alumina setter plates 200, 210 that are coated with ceria or GDC utilized during the firing of a partial cell structure including an anode support layer 135 that includes, consists essentially of, or consists of a mixture of SFCM and GDC, an anode functional layer 140 that includes, consists essentially of, or consists of a mixture of SFCM and GDC, and an electrolyte layer 120 that includes, consists essentially of, or consists of GDC. In other embodiments, one or both of the setter plates 200, 210 is composed of or coated with a material such as SDC.

Setter plates 200, 210 may be coated with or entirely composed of a mixture of GDC or other doped ceria or ceria and one or more of the volatile species in the ceramic or all-ceramic anode material (e.g., Co, Mo, Ni, Cr, V, Bi, Li, Na, and/or Cu). This may serve multiple functions, including but not limited to improved sintering of the setter or film disposed on the setter to achieve the appropriate particle or pore size and distribution and weight that results in a flat fired cell; to reduce driving forces for diffusion of volatile species into setter during high temperature sintering of cell materials; and to extend the lifetime of the setter for use in manufacturing of all-ceramic anode based cells. The volatile species may be present in the mixture with GDC or ceria in amounts between approximately 50 wt % and approximately 2 mol %. In various embodiments, the volatile species constitutes up to 25 wt % of the mixture with GDC or ceria. In various embodiments, the volatile species constitutes up to 10 wt % of the mixture with GDC or ceria. In an exemplary embodiment, 2 mol % $Co_3O_4$ is mixed with GDC and coated on an alumina setter, although other combinations are possible and fall within embodiments of the present invention.

In various embodiments, one of the setter plates 200, 210 is entirely composed of an unreactive material while the other is merely coated with one of the unreactive materials. For example, in an embodiment, setter plate 200 may be entirely composed of ceria, whereas setter plate 210 may be composed of an alumina setter plate with a ceria coating. Alternatively, setter plate 200 may be entirely composed of GDC, whereas setter plate 210 may be composed of an alumina setter plate with a GDC coating. In various embodiments, the setter plates 200, 210 are composed of or coated with the same unreactive material, while in other embodiments, each of the setter plates 200, 210 is composed of or coated with a different unreactive material. For example, setter plate 200 may be entirely composed of ceria, whereas setter plate 210 may be composed of an alumina setter plate with a GDC or Co-GDC coating.

In order to prevent deleterious reactions between the material of the setter plates, each of the setter plates 200, 210, or at least the external surface thereof, desirably has low concentrations of reactive elements (e.g., impurities). For example, in embodiments of the invention, a setter plate, or its external surface (e.g., the coating or an external surface thereof) includes less than 1000 ppm silica or silicon, less than 500 ppm zirconia or zirconium, less than 100 ppm yttria or yttrium, less than 100 ppm phosphorous, and/or less than 250 ppm aluminum. The setter plate or its external surface may contain finite, non-zero concentrations of one or more of these species, e.g., at least 1 ppm, at least 5 ppm, or at least 10 ppm. In various embodiments, a setter plate or its external surface may contain up to approximately 10% zirconia or zirconium. In various other embodiments, a setter plate or its external surface may contain up to approximately 100% stabilized zirconia, which may be stabilized with one or more different dopants (e.g., yttrium, scandium, calcium, magnesium, cerium, and/or aluminum) with concentrations between ~2 mol % and 10 mol %. In various other embodiments, a setter plate or its external surface may contain up to approximately 100% stabilized zirconia, which may be stabilized with one or more different dopants (e.g., yttrium, scandium, calcium, magnesium, cerium, and/or aluminum) with concentrations between ~2 mol % and 10 mol %.

Coated setter plates 200, 210 may be coated only on the exterior surface facing and/or contacting the partial cell (i.e., the top surface of bottom setter plate 200 and/or the bottom surface of top setter plate 210), or the setter plates 200, 210 may be coated on all of their external surfaces. The thickness of the coating may be chosen to be to extend the setter lifetime. The thickness of the coating is sufficient to prevent or minimize interaction between any reactive species from the partial cell structure (e.g., Co and/or Mo, and/or others described herein) and the coated interior ceramic material of the setter plate before and during the firing sequence. The desired coating thickness may also be chosen to optimize coated setter plate fabrication processes around the specific materials of the setter plate and film, and particle and/or pore size of the setter plate. For example, the thickness may be optimized to compensate for differences in the coefficients of expansion between the setter plate and the coating so as to prevent flaking or delamination of the coating from the setter plate. For example, the setter plate coating thickness may range from approximately 0.0002 mm to approximately 0.25 mm. Various embodiments have a thickness ranging from approximately 0.0002 mm to approximately 0.025 mm when using thin film deposition techniques such as plasma spray, physical vapor deposition, chemical vapor deposition, or pulsed laser deposition. In other embodiments, the thickness ranges from approximately 0.001 mm to 0.250 mm when using alternate deposition techniques such as dip coating, spray coating, roller coating, or screen printing.

To further extend the lifetime of the coated setter plate, the coating may be reapplied to the setter after the coated setter plate has been utilized in high-temperature sintering processes one or more times. For example, in certain embodiments the coating may be reapplied to the setters after 20 firings. In other embodiments, the coating may be reapplied after 10 firings. The reapplied coating may be of the same formulation as original coating or the reapplied coating may be based primarily on the volatile species found in the all-ceramic or ceramic anode material (e.g., Co, Mo, Ni, Cr, V, Bi, Li, Na, and/or Cu). For example, virgin (uncoated) setter plates 200, 210 may be originally coated with Co-GDC and annealed prior to high temperature sintering of ceramic or all-ceramic anode materials. After one or more (e.g., 20) high-temperature sintering heat treatments, a coating of Co-GDC or $Co_3O_4$ may be reapplied to the setters, followed by an optional anneal step prior to using the setters for additional high-temperature sintering heat treatments of the anode materials.

In accordance with embodiments of the present invention, at least setter plate 210 (and, in various embodiments, both setter plates 200, 210) has a weight selected to apply a desired amount of loading on the partial cell structure during firing in order to, e.g., maintain the desired shape and flatness of the partial cell structure during firing, and/or to improve partial cell strength and sintering of particles and the electrolyte densification during firing. (It is understood that, in various embodiments of the invention, either or both of setter plates 200, 210 may actually be formed of multiple discrete, stacked plates, e.g., in order to provide the desired setter weight and/or thickness for a particular material to be fired; thus, a "setter plate" need not be, but may be, a single unitary plate.) In various embodiments, setter plate 210 (and, in various embodiments, both setter plates 200, 210) has a weight (selected by, e.g., adjusting the thickness of the setter plate; the amount by which the edge of the setter plate overhangs the cell structure, if any; the porosity of the setter plate; and/or the density (e.g., apparent density) of the setter plate) ranging from approximately 0.1 $g/cm^2$ to approximately 5 $g/cm^2$, defined relative to the greenbody (i.e., partial cell laminate) area; this represents the amount of loading applied to the cell structure during firing. In various embodiments, the weight ranges from approximately 0.25 g/cm² to 3 g/cm². In various embodiments, the amount by which the edge of the setter plate overhands the cell structure may range from approximately 0.01 cm to approximately 3 cm on each side of the greenbody. In various embodiments, the thickness of the setter plate 210 (and, in various embodiments, both setter plates 210) ranges from approximately 3 mm to approximately 16 mm. In accordance with embodiments of the present invention, at least setter plate 210 (and, in various embodiments, both setter plates 210) has a porosity ranging from approximately 25% to approximately 75%, ranging from approximately 55% to approximately 65%, or of approximately 60%. The porosity allows gas permeation during firing for evolved gas (e.g., polymer/organic burnout), and also enables the firing atmosphere to access the cell during firing. The material of the setter plates defining and between the porosity may be substantially fully (i.e., 100%) dense.

Setter pore size may range from approximately 0.001 mm to approximately 1 mm on average. Various embodiments have pore size that may range from approximately 0.001 mm to approximately 0.50 mm on average. Various embodiments have pore size that may range from approximately 0.001 mm to approximately 0.30 mm on average. Various other embodiments have pore sizes that range from approximately 0.005 mm to approximately 0.15 mm on average. Pores present in setter plates in accordance with embodiments of the present invention need not be spherical; therefore, the pores may have different sizes in different dimensions. For example, pore size may be different in the thickness dimension (the "z" dimension) than it is in the areal dimension (the "x-y" dimension). Setter particle size may range from approximately 0.001 mm to approximately 0.500 mm on average. Various embodiments have particle sizes that range from approximately 0.01 mm to approximately 0.15 mm. For the purpose of clarity, the particles may comprise crystallites and grains that are smaller than the particle itself. For the purpose of clarity, for solid phase densities less than 100% dense, there may be nano-sized porosity less than 0.001 mm.

In various embodiments of the invention, the setter plates 200, 210 have a curvature ranging from less than or equal to approximately 10 μm/cm to approximately 25 μm/cm, measured from center to edge. In various embodiments, the curvature is no greater than 10% different when measured in the x- or y-dimension (from any given edge), or from corner to corner over the setter plate. In various embodiments, the setter plates 200, 210 have a maximum-to-minimum height difference of less than or equal to approximately 100 μm, e.g., approximately 25 μm to approximately 50 μm, across the entire setter plate surface. In various other embodiments, the setter plates 200, 210 have a maximum-to-minimum height difference of less than or equal to approximately 50 μm, e.g., approximately 10 μm to approximately 30 μm, across the entire setter plate surface.

Setter plates 200, 210 may be fabricated in accordance with embodiments of the invention in any of a variety of different ways. For example, coated setter plates 200, 210 may feature an interior (or "core") porous plate or layer that includes, consists essentially of, or consists of a ceramic material such as alumina, YSZ, silicon carbide, or other materials known to persons having ordinary skill in the art. For example, suitable alumina plates are available from commercial sources. The porous ceramic plate may be coated, at least on one surface, with the suitable coating material (as discussed herein) via, for example, a colloidal process or wet chemical deposition, in which a powder or other precursor of the coating material is mixed with agents such as a solvent (e.g., water, ethanol, texanol, terpineol), one or more surfactants (e.g., phosphate ester) or pH adjusters (e.g., acid), pore formers (e.g., PMMA microspheres), and/or a binder (e.g., cellulose), and the resulting slurry or paste applied to the ceramic plate via, e.g., dip coating, rolling, screen printing, spraying, or brushing. In other embodiments, the coating material may be applied by physical vapor deposition (e.g., sputtering from a sputtering target composed of the coating material) or atomic layer deposition or pulsed laser deposition. After coating, the coated plate may be annealed at a temperature of, e.g., approximately 500° C. or higher, or even approximately 1000° C. or higher. For example, the coated plate may be annealed at approximately 1300° C. for approximately 2 hours. Such anneal steps may not be required, depending upon the technique by which the coating is applied.

Setter plates 200, 210 that are entirely composed of the desired unreactive material may be formed by, for example, a wet process in which powders of the desired material are mixed with agents such as a solvent, a surfactant, pore formers, and/or a binder, and the resulting slurry cast into a mold or extruded into the proper shape for the setter. The resulting green (i.e., unfired) setter plate is allowed to dry and then fired at a temperature sufficient for sintering and the appropriate amount of densification to occur (e.g., approximately 1000° C. or higher). The extruded green shape may be a sheet that is prepared using, for instance, tape casting with (green tape) layers of up to approximately 0.250 to 1.2 mm. Multiple layers of the green tape may be laminated together using uniaxial and/or isostatic pressing (e.g., by cold isostatic pressing, warm isostatic pressing, or hot isostatic pressing). In other embodiments, such setter plates may be formed via a dry process in which powders of the desired material are mixed together (typically with binder and possibly other additives), placed in a mold, and then pressed uniaxially or isostatically. The resulting green (i.e., unfired) setter plate may then fired at a temperature sufficient for sintering and the appropriate amount of densification to occur (e.g., approximately 1000° C. or higher), unless sufficient heat was applied during the pressing step itself, in which case such firing may be omitted or curtailed. The coating may be alternately deposited by laminating a green tape of the coating material to the green tape(s) making up the core setter plate and subsequently annealing at high temperatures.

In various embodiments, the thickness, camber, and/or surface roughness of the setter plates may at least partially result from the specific fabrication processes prior to and through the completion of the annealing step(s) of the setter. In other embodiments, the thickness, camber, and/or surface roughness of the setter plates may result from a machining operation (e.g., surface grinding) to one or both surfaces of the setter plate.

In various embodiments, setter plates 200, 210 are fired during fabrication at a temperature greater than that utilized to fire the cell structure using the setter plates. Such thermal treatment may result in increased density of the setter plate 200, 210 and/or the coating thereon such that the setter plate or coating will not further sinter appreciably during firing of the cell structure. This may advantageously result in no crack formation and/or volumetric changes in the setter plates that might deleteriously impact the cell structure during firing thereof.

After firing, the fired partial cell structure including the electrolyte 120 and the anode 130 may be removed from the kiln or furnace, and the setter plates 200, 210. Additional steps may subsequently be performed to complete the fabrication of SOFC 100. For example, the cathode 110 may be applied as a suspension or paste (e.g., mixed with one or more liquid agents) via, e.g., drop coating, spin coating, spray coating, blade coating, or screen printing. The cathode 110 may then be allowed to dry and fired for densification. The cathode 110 may even be fired utilizing one or more setter plates in accordance with embodiments of the invention and described herein. For example, the cathode 110 may be formed on the SOFC 100 prior to firing, in such embodiments, the entire cell structure is co-fired in the same firing step. Alternatively, the cathode may be deposited using physical vapor deposition (e.g., sputtering from a sputtering target composed of the coating material) or atomic layer deposition or pulsed laser deposition. Before or after formation of the cathode 110, the SOFC 100 (or portion thereof) may be cut to a desired size by, for example, laser cutting, and/or may be polished. Electrical contact layers may be formed over SOFC 100 to enable electrical connections to the anode 130 and cathode 110. Any firing steps after the initial partial cell firing may also utilize one or more setter plates in accordance with embodiments of the invention and described herein.

EXAMPLES

Figure 3:
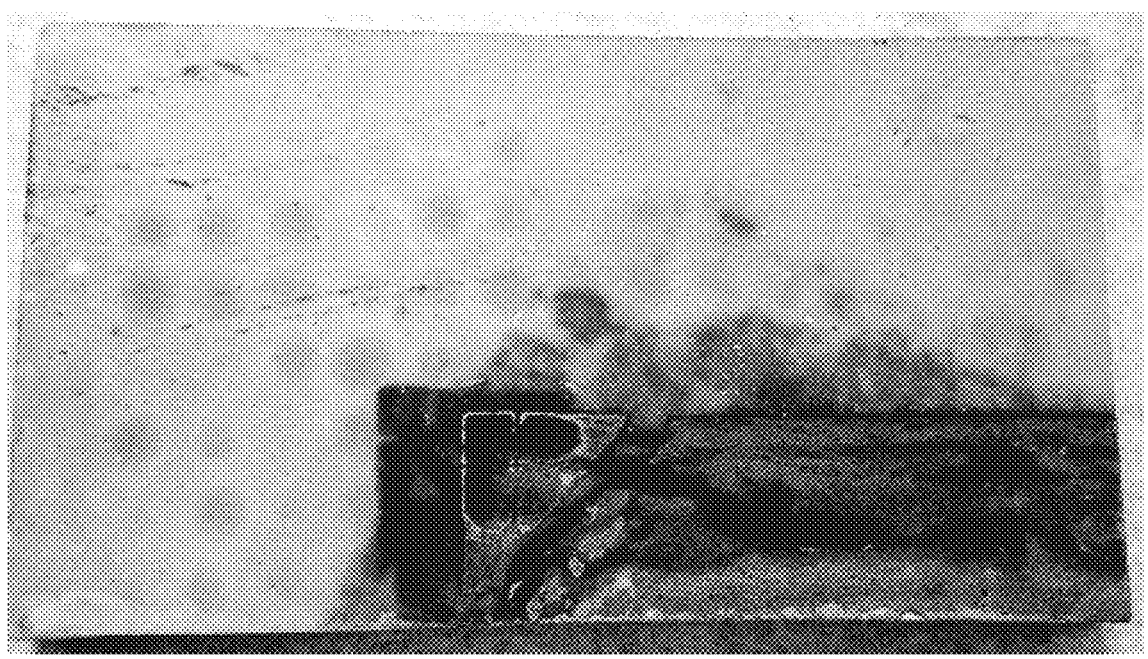
FIG. 3 is a photograph depicting an alumina setter plate after firing of SFCM-based cell material thereon.

Various different setter plates were utilized to fire a partial cell structure featuring an SFCM anode material in order to demonstrate advantages of setter plates in accordance with the present invention. In the first test, the SFCM material was fired at a temperature of 1300° C. for four hours using an uncoated commercially available alumina setter plate. FIG. 3 is a photograph of the alumina setter plate after firing and after being cut in half to examine the depth of the reactive region. As shown, in the lower right-hand portion of the setter, the SFCM material reacted with the alumina setter, and the SFCM material stuck to the setter after firing, resulting in multiple breaks and cracks in the material. In addition, even portions of the setter not in contact with the SFCM material (e.g., the upper portion of FIG. 3) turned blue due to reaction with Co vapor evolved from the SFCM material during firing. The penetration depth of the Co is believed to be in the range of ~1-2 mm. These problems are exacerbated when firing large format cells (e.g., sizes greater than approximately 1 cm by 1 cm). Thus, it was found that alumina setter plates are unsuitable for firing of SOFCs featuring SFCM materials, especially when firing cells of a practical size (e.g., sizes greater than approximately 5 cm by 5 cm).

The SFCM material was a nominally 5 cm by 5 cm partial cell laminate (size is referenced to the final fired size) composed of different tape cast layers. The anode support layer (ASL) was a composite comprising a mixture of SFCM and gadolinium-doped cerium oxide ($Ce_{0.9}Gd_{0.1}O_{1.95}$, GDC10) plus ~2 mol % $Co_3O_4$ (the GDC10 and $Co_3O_4$ collectively referred to as Co-GDC), where the SFCM had the composition $SrFe_{0.2}Co_{0.4}Mo_{0.4}O_3$ (SFCM244 or simply SFCM). The ASL had 67 wt % SFCM and 33 wt % GDC10 (due to relatively small amount of cobalt oxide, this is essentially Co-GDC). The electrolyte comprised gadolinium-doped ceria and had the composition $Ce_{0.9}Gd_{0.1}O_{1.95}$ (GDC10).

An ASL tape cast slurry was prepared by mixing, in a ball mill, various powders and other additives, including SFCM, GDC10, PMMA microspheres, cobalt oxide ($Co_3O_4$), binder, dispersant, and solvent. An electrolyte tape was prepared by mixing, in a ball mill, various powders and other additives, including GDC10, binder, dispersant, and solvent. The ASL tape thickness was around 200 µm to 250 µm, and the electrolyte tape was about 20 microns thick. The ASL and electrolyte tapes were cut to size with a razor blade, stacked, and laminated into a partial cell green laminate using a heated uniaxial press.

The first test setter was a new (virgin) uncoated setter and required no prior preparation. The partial cell green laminate was placed on the top surface of the first setter plate. A second setter plate was placed on top of the partial cell green laminate. The second setter was sized with an overhang of up to approximately 1.5 mm on each side, and with a weight between 0.9 g/cm² and 1.2 g/cm², both defined relative to the partial cell green laminate dimensions. The entire assembly was then placed inside a high-temperature kiln. The kiln temperature increased with at least a single burnout dwell around 400° C. for ~1 hour before the temperature was ramped to 1300° C., dwelled for approximately 4 hours, and subsequently decreased to room temperature.

Figure 4A:
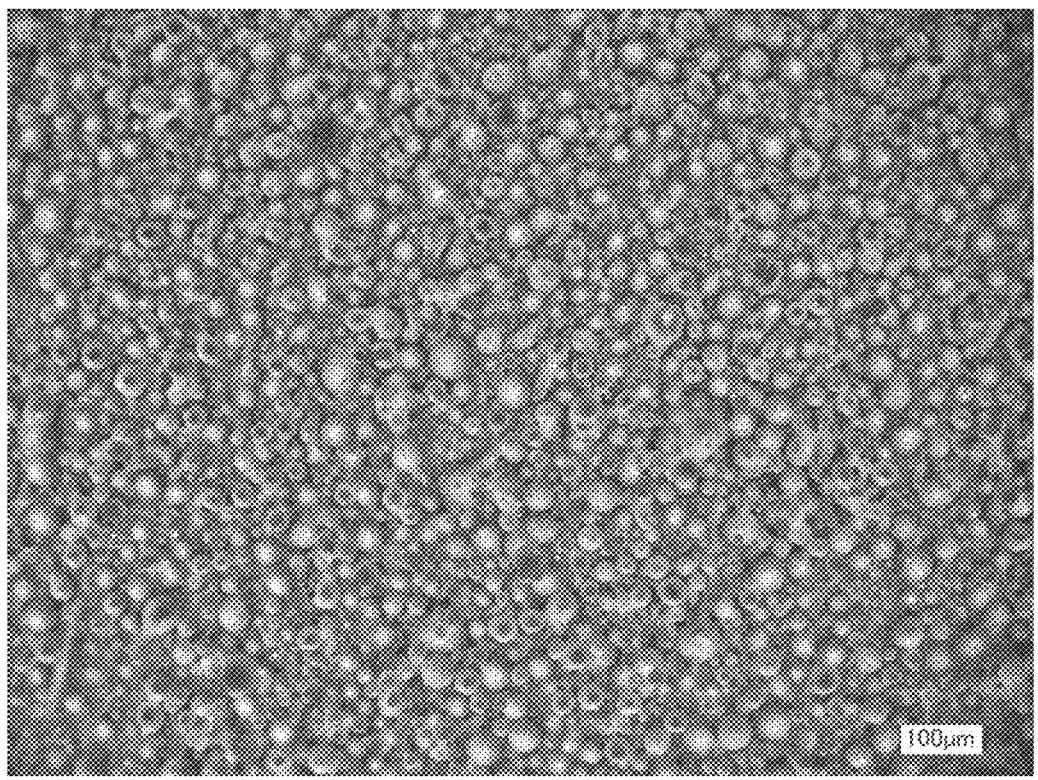
FIG. 4A is a magnified optical image of the surface of the setter plate of FIG. 3.
Figure 4B:
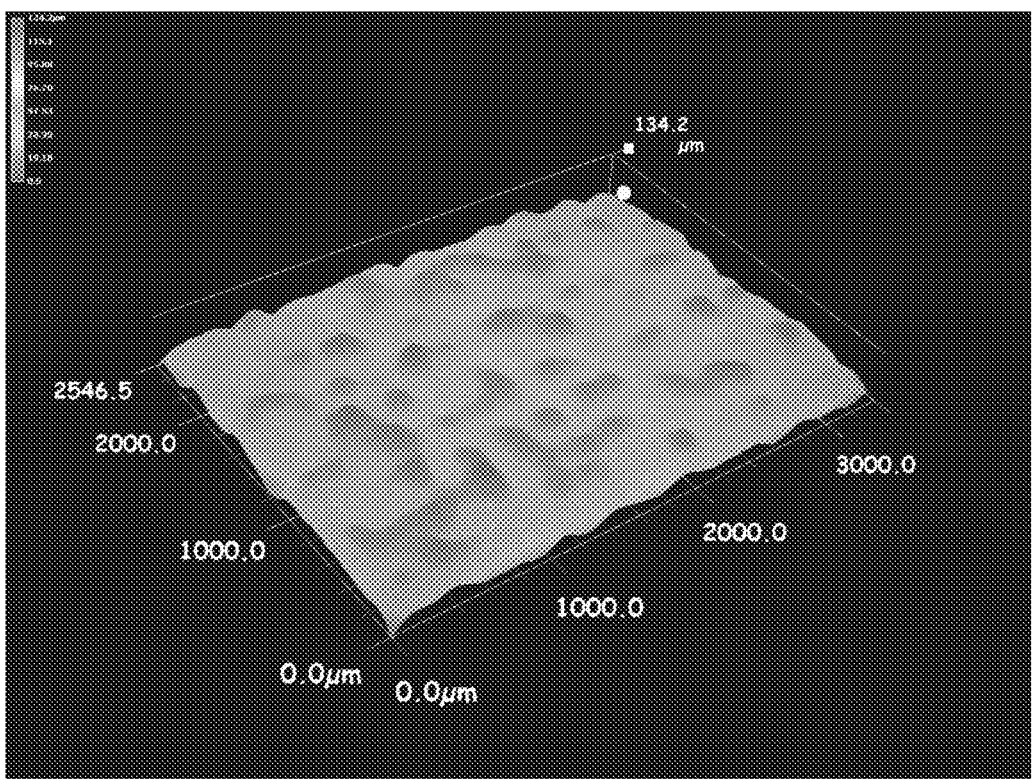
FIG. 4B is a map of surface height of the setter plate surface of FIG. 4A.

FIG. 4A shows a high-depth-of-field, optical image of the uncoated (virgin) alumina setter surface at 100× magnification taken with a Keyence VHX-2000e Scanning Microscope. FIG. 4B shows the three-dimensional height profile generated from data collected during the capture of the optical image of FIG. 4A. The grain or particle size from the image varies mainly between 25 microns and 100 microns. Higher magnification shows particles and pores less than 10 microns in size. While the optical image of FIG. 4A suggests quasi-spherical particles constituting the solid phase of the uncoated alumina setter, the three-dimensional profile in FIG. 4B reveals that the surface resembles a series of connected islands or a reticulated structure. The two images together suggest a solid surface with structures ranging in size from a few microns to hundreds of microns. It may be seen that the pores (i.e., the depressed regions in FIG. 4B) appear to be around the same size as the particles. The entire surface of a new (virgin) setter plate was scanned with a Keyence VR-3200 macroscope and found to have a surface with a maximum to minimum height difference of less than or equal to approximately 25 µm to 50 µm across the full length and width of the setter plate (approximately 15 cm by 15 cm). Analysis of the data revealed a surface roughness (Sa) of 0.089 mm. An analysis of pore size distribution for entire setter surface from the macroscope data also revealed that the maximum pore size of the setter was around 800 microns, while the minimum pores size was a little under 200 microns. The average pore size was 282 microns with a standard deviation of about 100 microns. It is possible that smaller particles and pores were present in the setter, but alternate characterization techniques would be needed for verification.

Figure 5:
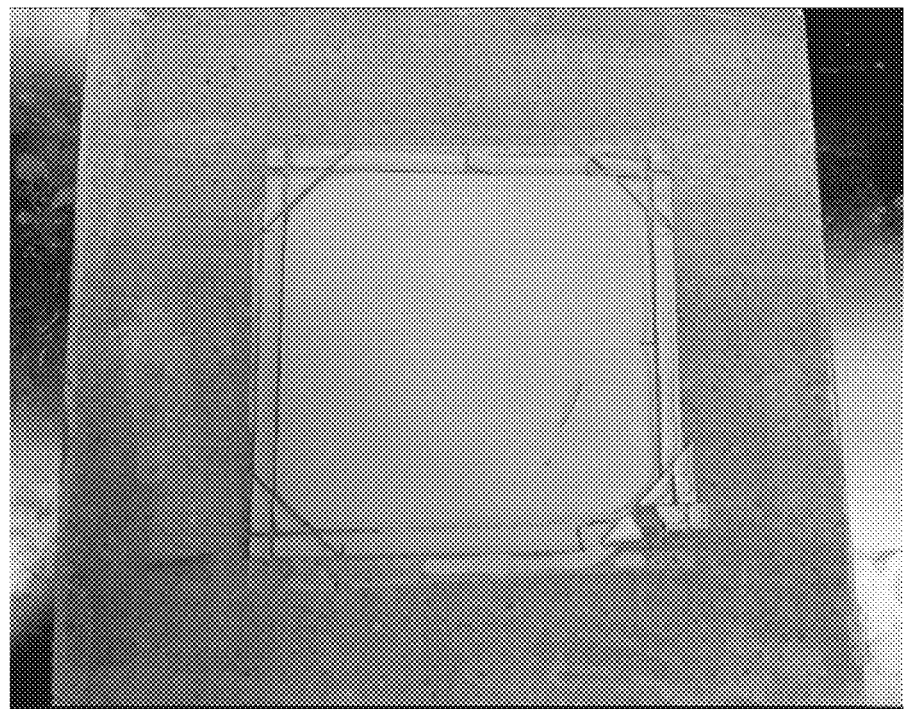
FIG. 5 is a photograph of an SFCM-coated alumina setter plate and an SFCM-based cell material thereon after firing, resulting in cracks and sticking of the cell material.

In the second test, the SFCM material was fired at a temperature of 1300° C. for four hours utilizing an alumina setter plate that had been coated with an SFCM layer and fired. FIG. 5 is a photograph of the setter plate and SFCM material after firing. As shown, the partial cell material stuck to the setter plate and was unable to be removed, rendering the setter completely useless. While only one macro-sized crack can actually be seen in the lower right portion of the image, there were likely micro-sized cracks throughout the cell, as the cell was unable to properly shrink due to the sticking of the cell to the setter plate. Note, that the separations at the outer border of the cell in the image are not cracks resulting from reaction with the setter but rather are the result of intentional scribing or scoring of the edges of the green laminate before firing. These problems are exacerbated when firing large format cells (e.g., sizes greater than approximately 1 cm by 1 cm). Thus, even an SFCM coating on an alumina setter plate is unsuitable for firing of SOFCs featuring SFCM materials, especially when firing cells of a practical size (e.g., sizes greater than approximately 5 cm by 5 cm).

The SFCM material was a nominally 5 cm by 5 cm partial cell laminate (size is referenced to the final fired size) made up of different tape cast layers. The ASL was a composite comprising a mixture of SFCM and gadolinium-doped cerium oxide ($Ce_{0.9}Gd_{0.1}O_{1.95}$, GDC10) plus 2 mol % $Co_3O_4$ (the GDC10 and $Co_3O_4$ collectively referred to as Co-GDC), where the SFCM had the composition $SrFe_{0.2}Co_{0.4}Mo_{0.4}O_3$ (SFCM244 or simply SFCM). The ASL had 67 wt % SFCM and 33 wt % GDC10 (due to relatively small amount of cobalt oxide, this is essentially Co-GDC). The electrolyte comprised gadolinium-doped ceria and had the composition $Ce_{0.9}Gd_{0.1}O_{1.95}$ (GDC10).

An ASL tape cast slurry was prepared by mixing, in a ball mill, various powders and other additives, including SFCM, GDC10, PMMA microspheres, cobalt oxide ($Co_3O_4$), binder, dispersant, and solvent. An electrolyte tape was prepared by mixing, in a ball mill, various powders and other additives, including GDC10, binder, dispersant, and solvent. The ASL tape thickness was around 200 µm to 250 µm and the electrolyte tape thickness was about 20 microns. The ASL and electrolyte tapes were cut to size with a razor blade, stacked, and laminated into a partial cell green laminate using a heated uniaxial press.

The first setter plate for the second test was prepared by coating a new (virgin) alumina setter with a slurry paste of SFCM. The slurry was prepared by mixing SFCM powder, texanol-based vehicle, and ethanol in a ball mill and subsequently coating the setter with a roller. The film on the setter was then dried and fired at 1300° C. for 4 hours. The second setter plate was an uncoated, new (virgin) alumina setter plate. The second setter was sized with an overhang of up to approximately 1.5 mm on each side, and with a weight between 0.9 g/cm² and 1.2 g/cm², both defined relative to the partial cell green laminate dimensions. The partial cell green laminate was placed on the top surface of the first setter plate with the anode facing the first setter plate. The second setter plate was placed on top of the partial cell green laminate. The entire assembly was then placed inside a high temperature kiln. The kiln temperature increased with at least a single burnout dwell around 400° C. for ~1 hour before the temperature was ramped to 1300° C., dwelled for approximately 4 hours, and was subsequently cooled to room temperature.

Figure 6:
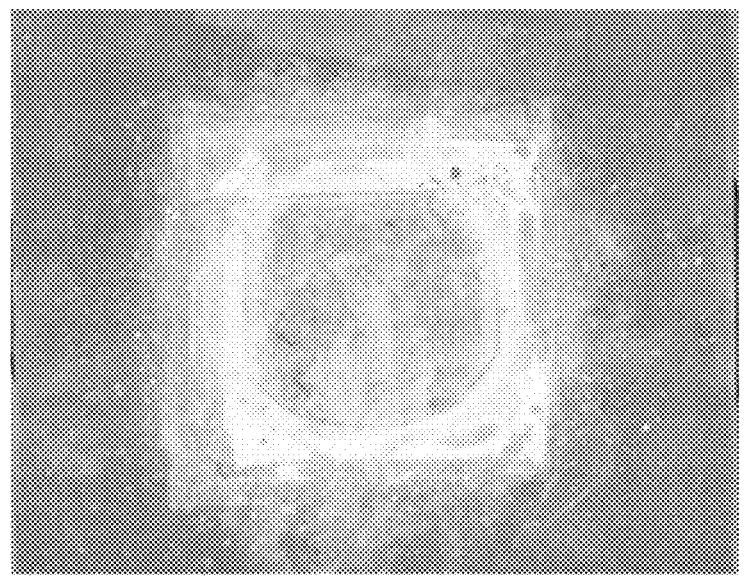
FIG. 6 is a photograph of an alumina setter plate coated with a $Co_3O_4$ layer and utilized for the firing of SFCM-based cell materials.

In the third test, the SFCM material was fired at a temperature of 1200° C.-1300° C. for four hours utilizing an alumina setter plate that had been coated with a $Co_3O_4$ layer and fired. FIG. 6 is a photograph of the setter plate after firing. The SFCM material stuck to the coated setter plate, but not to the extent that sticking was observed with the uncoated alumina setter plate in the first test or with the SFCM-coated setter in the second test. However, the resulting cracking and breaking in the SFCM material indicates that the Co-based layer does not form a sufficient barrier between the alumina setter plate and the SFCM material, although the setter plate with the Co-based layer exhibited improved behavior compared to an uncoated setter plate. These problems are exacerbated when firing large format cells (e.g., sizes greater than approximately 1 cm by 1 cm). In addition, as shown in FIG. 6, a white composition formed underneath the SFCM material. In this region, the SFCM material stuck to the setter plate particularly tightly. Thus, it was found that a $Co_3O_4$ layer utilized as a coating on an alumina setter plate is unsuitable for firing of SOFCs featuring SFCM materials, especially when firing cells of a practical size (e.g., sizes greater than approximately 5 cm by 5 cm).

The SFCM material was a nominally 5 cm by 5 cm partial cell laminate (size is referenced to the final fired size) made up of different tape cast layers. The ASL was a composite comprising a mixture of SFCM and gadolinium-doped cerium oxide ($Ce_{0.9}Gd_{0.1}O_{1.95}$, GDC10) plus ~2 mol % $Co_3O_4$ (the GDC10 and $Co_3O_4$ collectively referred to as Co-GDC), where the SFCM had the composition $SrFe_{0.2}Co_{0.4}Mo_{0.4}O_3$ (SFCM244 or simply SFCM). The ASL had 67 wt % SFCM and 33 wt % GDC10 (due to relatively small amount of cobalt oxide, this is essentially Co-GDC). The electrolyte comprised gadolinium-doped ceria and had the composition $Ce_{0.9}Gd_{0.1}O_{1.95}$ (GDC10).

An ASL tape cast slurry was prepared by mixing, in a ball mill, various powders and other additives, including SFCM, GDC10, PMMA microspheres, cobalt oxide ($Co_3O_4$), binder, dispersant, and solvent. An electrolyte tape was prepared by mixing, in a ball mill, various powders and other additives, including GDC10, binder, dispersant, and solvent. The ASL tape thickness was around 200 µm to 250 µm and the electrolyte tape was about 20 microns thick. The ASL and electrolyte tapes were cut to size with a razor blade, stacked, and laminated into a partial cell green laminate using a heated uniaxial press.

The first setter plate for the second test was prepared by coating a new (virgin) alumina setter with a slurry of $Co_3O_4$. The slurry was prepared by mixing $Co_3O_4$, texanol-based vehicle, and ethanol in a ball mill and subsequently coating the setter with a roller. The film on the setter was then dried and fired at 1300° C. for 4 hours. The second setter plate was an uncoated, new (virgin) alumina setter plate. The second setter was sized with an overhang of up to approximately 1.5 mm on each side, and with a weight between 0.9 g/cm² and 1.2 g/cm², both defined relative to the partial cell green laminate dimensions. The partial cell green laminate was placed on the top surface of the first setter plate with the anode facing the first setter plate. The second setter plate was placed on top of the partial cell green laminate. The entire assembly was then placed inside a high temperature kiln. The kiln temperature increased with at least a single burnout dwell around 400° C. for ~1 hour before the temperature was ramped to 1200° C., dwelled for approximately 4 hours, and was subsequently cooled to room temperature. Using new (virgin) alumina setters and recoating the first setter plate, the same process was followed using a new partial cell green laminate but the sintering temperature was increased to 1300° C. Sintering at 1300° C. resulted in more reaction than 1200° C., but both cases were better than the first and second tests detailed above.

Figure 7A:
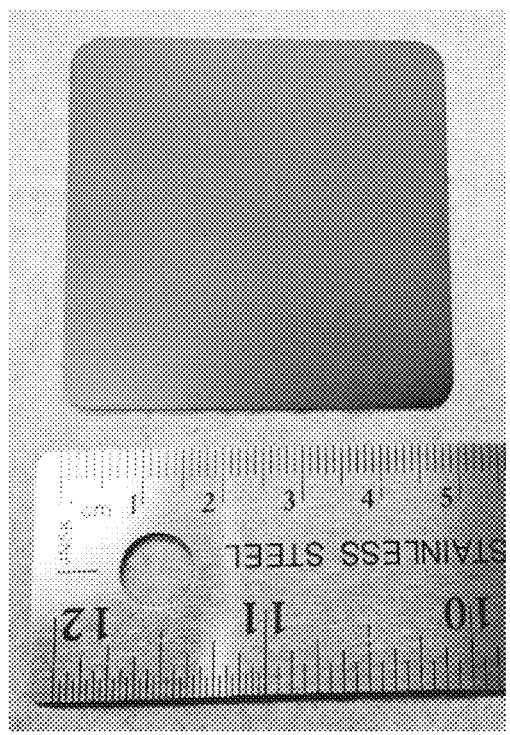
FIGS. 7A and 7B are photographs of SFCM-based cells successfully fabricated in accordance with embodiments of the invention.
Figure 7B:
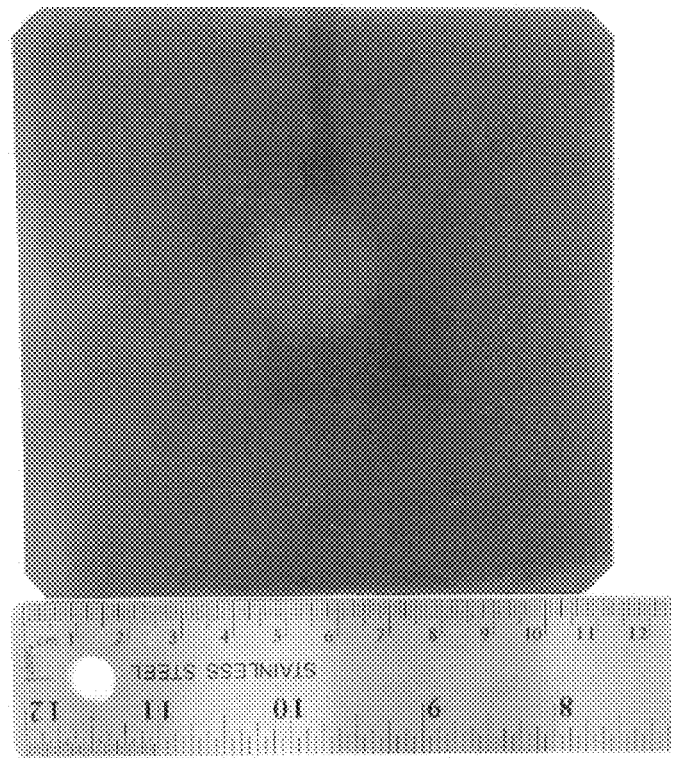

In the fourth test, an alumina setter was coated with GDC and utilized to fire SFCM materials at a temperature of 1000° C.-1300° C. for four hours. Even after multiple firings of different SFCM materials, the fired cell materials were easily removed from the setter without cracking or fracture. FIGS. 7A and 7B are photographs of the electrolyte side of a nominally 5 cm by 5 cm SFCM cell (5×5) and a nominally 10 cm by 10 cm SFCM cell (10×10) fired utilizing the GDC-coated setter plate. As shown, the cells are fully intact and crack-free. The flatness of the 10×10 cm SFCM cell was evaluated utilizing a Keyence VR-3200 Wide-Area 3D Measurement Macroscope. Two scans were performed that spanned the entire cell and passed through the center point of the cell, one in the horizontal ("x") direction, and one in the vertical ("y") direction. In the horizontal scan, the cell was found to be flat to within 0.054 mm (maximum to minimum across 11 cm), and in the vertical scan, the cell was found to be flat to within 0.024 mm (maximum to minimum across ~11 cm).

The SFCM materials were a nominally 5×5 and a nominally 10×10 partial cell laminates (size is referenced to the final fired size) made up of different tape cast layers. The ASL was a composite comprising a mixture of SFCM and gadolinium-doped cerium oxide ($Ce_{0.9}Gd_{0.1}O_{1.95}$, GDC10) plus ~2 mol % $Co_3O_4$ (the GDC10 and $Co_3O_4$ collectively referred to as Co-GDC), where the SFCM had the composition $SrFe_{0.2}Co_{0.4}Mo_{0.4}O_3$ (SFCM244 or simply SFCM). The ASL had 67 wt % SFCM and 33 wt % GDC10 (due to relatively small amount of cobalt oxide, this is essentially Co-GDC). The electrolyte comprised gadolinium-doped ceria and had the composition $Ce_{0.9}Gd_{0.1}O_{1.95}$ (GDC10).

An ASL tape cast slurry was prepared by mixing, in a ball mill, various powders and other additives, including SFCM, GDC10, PMMA microspheres, cobalt oxide ($Co_3O_4$), binder, dispersant, and solvent. An electrolyte tape was prepared by mixing, in a ball mill, various powders and other additives, including GDC10, binder, dispersant, and solvent. The ASL tape thickness was around 200 μm to 250 μm and the electrolyte tape was about 20 microns thick. The ASL and electrolyte tapes were cut to size with a razor blade, stacked, and laminated into a partial cell green laminate using a heated uniaxial press.

The first setter plate for the fourth test was prepared by coating a new (virgin) alumina setter with a slurry of GDC. The slurry was prepared by mixing GDC10, texanol-based vehicle, and ethanol in a ball mill and subsequently coating the setter with a roller. The film on the setter was then dried and fired at 1300° C. for 4 hours. The second setter plate was a new (virgin) alumina setter plate with a GDC10 coating on the side that came into contact with the electrolyte. The second setter was sized with an overhang of up to approximately 1.5 mm on each side, and with a weight between 0.9 $g/cm^2$ and 1.2 $g/cm^2$, both defined relative to the partial cell green laminate dimensions. Keyence microscope images showed the thickness of the GDC10 coating on the alumina setter was approximately 4-8 microns thick measured from the surface of the alumina setter to the top of the film. The GDC10 coating also penetrated into the porous surface of the alumina setter by an additional approximately 10 to 50 microns, coating the alumina particles within the pores of the setter. The partial cell green laminate was placed on the top surface of the first setter plate with the anode in contact with the GDC coating on the setter plate. The second setter plate was placed on top of the partial cell green laminate. The entire assembly was then placed inside a high temperature kiln. The kiln temperature increased with at least a single burnout dwell around 400° C. for ~1 hour before the temperature ramped to 1000° C., dwelled for approximately 4 hours, and was subsequently cooled to room temperature. After the first firing at 1000° C., the same set of setter plates were used with the same firing process but with the sintering temperature increased for full firings at 1050° C., 1100° C., 1150° C., 1200° C., 1250° C., and 1300° C. using a new partial cell green laminate in each case. The fact that multiple partial cells were successfully fired in separate firings with the same set of GDC-coated setter plates and with no apparent degradation of the GDC coating on the setter plates demonstrates that this is a robust approach for manufacturing large-format, all-ceramic anode cells.

Figure 8:
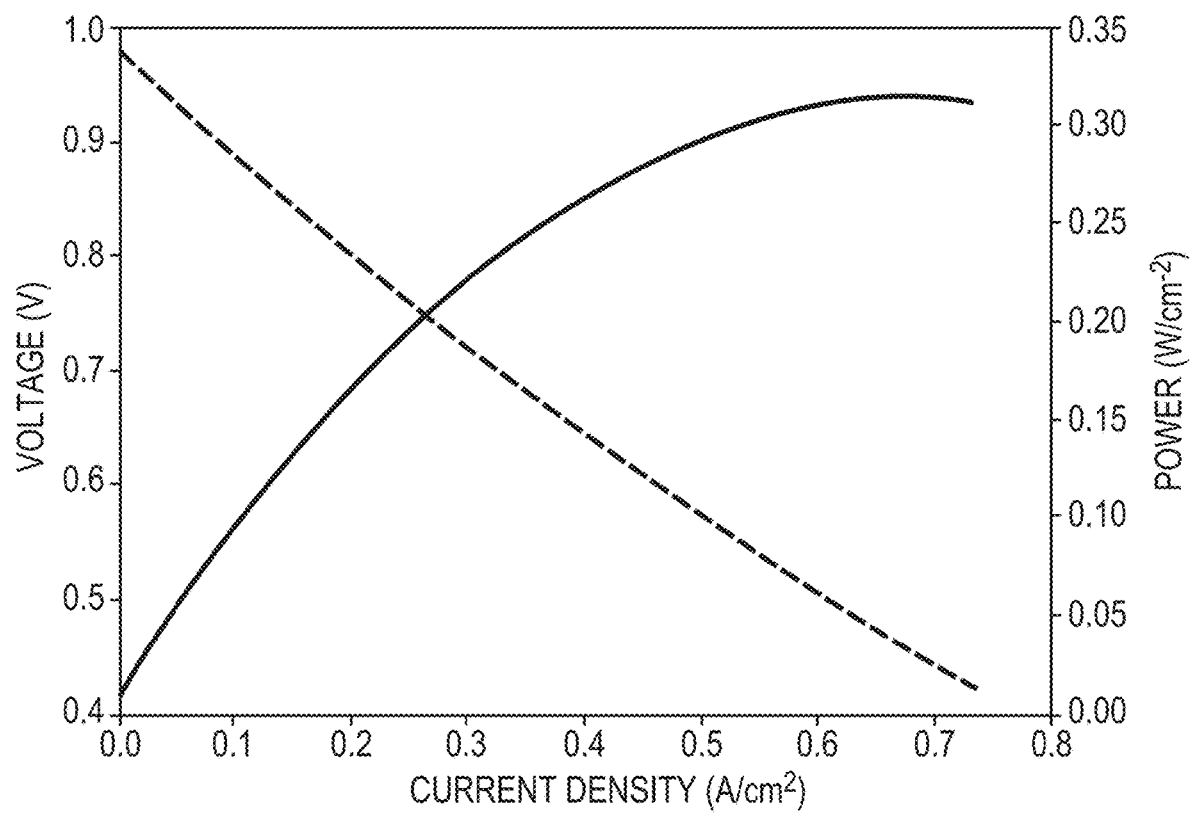
FIG. 8 depicts voltage-current characterization results at 500° C. for a 5×5 SFCM anode-based cell successfully fabricated in accordance with embodiments of the invention.

FIG. 8 shows the voltage-current characterization results at 500° C. for a 5×5 SFCM anode-based cell fired using the GDC-coated setter of the fourth test. The characteristic reveals an open circuit voltage of ~0.98 V and a maximum power density of ~0.31 $W/cm^2$ at 500° C. in a fuel comprising ~7% $CH_4$, ~90% $H_2$, and 3% $H_2O$. This is similar to results for a ~1" diameter button sized SFCM anode-based cell (for example, as shown in International (PCT) Patent Application No. PCT/US2017/023063, filed on Mar. 17, 2017, the entire disclosure of which is incorporated by reference herein), which was shown to have an open circuit voltage of ~0.95 V and a maximum power density of ~0.45 $W/cm^2$ at 500° C. but for a fuel comprising 97% $H_2$ and 3% $H_2O$. The 5×5 cell that was tested had not yet been fully optimized and it should be pointed out that fuel with methane is typically accompanied by a loss of power relative to pure hydrogen fuel, especially when the fuel utilization is higher as is the case in the 5×5 test. Despite the lower performance of the non-optimized 5×5 cell versus the button cell, the test results very clearly show that large format cells can be produced without undesirable cracks or other defects; survive subsequent processing steps to create an entire cell; be assembled in stack hardware (together with seals and stainless steel interconnects); and be used to electrochemically convert fuel into electricity at elevated temperatures. Such a large format cell was made possible through the use of the improved setter.

Figure 9A:
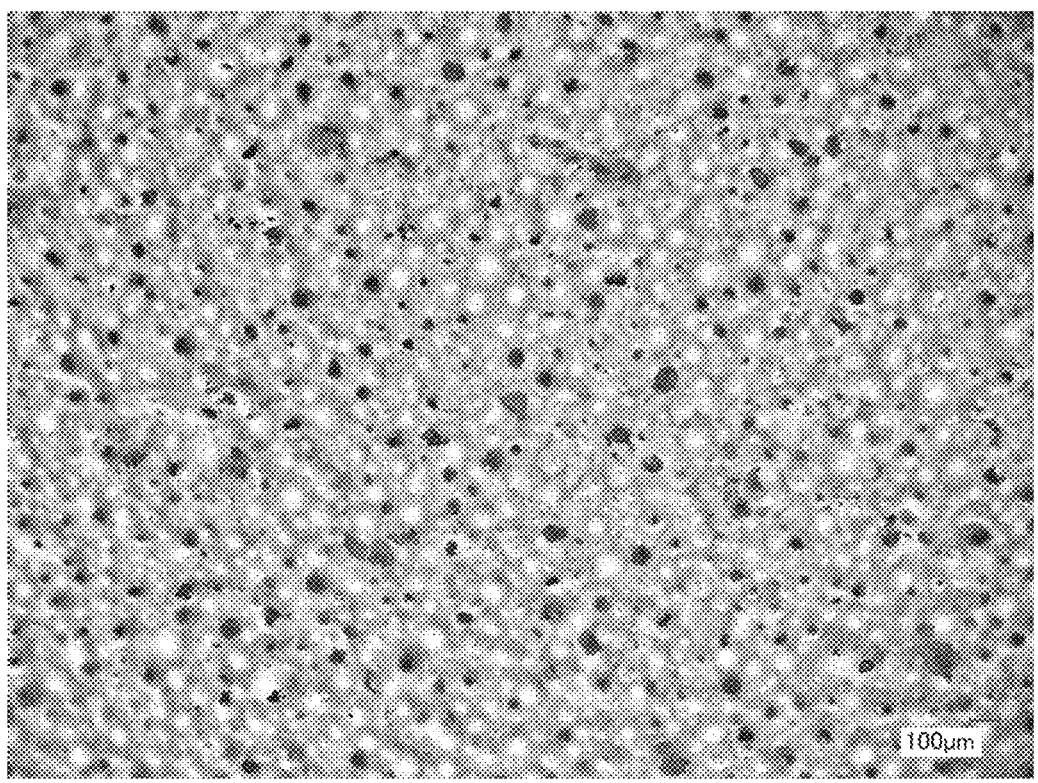
FIG. 9A is a magnified optical image taken of a surface of a GDC-coated setter plate in accordance with embodiments of the invention.
Figure 9B:
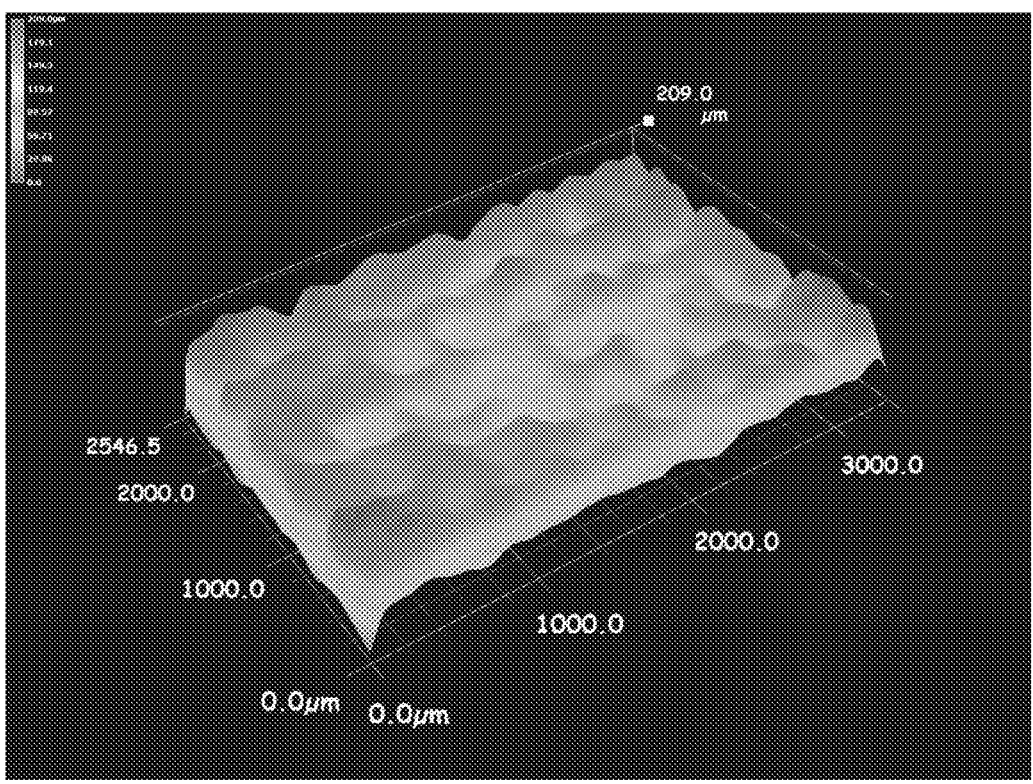
FIG. 9B is a map of surface height of the setter plate surface of FIG. 9A.

FIG. 9A shows a high-depth-of-field, optical image taken of the GDC-coated alumina setter surface at 100× magnification with a Keyence VHX-2000e Scanning Microscope. FIG. 9B shows a three-dimensional height profile generated from data collected during the capture of the optical image of FIG. 9A. The grain or particle size from the image appears to vary mostly between 25 microns and 100 microns. Higher magnification shows particles and pores less than 10 microns in size. In comparison to the uncoated surface, the coated surface appears more continuous with less porosity overall and/or less bumpiness. This is further supported in the surface height profile for the GDC-coated surface in FIG. 9B. The coated surface appears to have larger solid regions than the uncoated surface, perhaps as large as 500 microns between pores. Pore size seems slightly larger than in the case of the uncoated surface but there is less surface porosity. The smaller pores in the coated surface were likely filled by the coating, whereas the larger pores may be simply too large for a continuous coating to fill them, at least for a coating of this thickness. Higher magnification showed that regions of the coating that appear dense at 100× magnification still contain a small quantity of very small pores in addition to the large pores seen at the lower magnification.

In the fifth test, a bulk ceria setter plate was fabricated by pressing a ceria powder and firing the pressed powder to a temperature greater than 1300° C. The ceria setter plate was subsequently utilized for the firing of SFCM cell materials at a temperature of 1300° C. for four hours. Even after multiple firings of different SFCM materials, the fired cell materials were easily removed from the setter without cracking or fracture, resulting in cells resembling those depicted in FIGS. 7A and 7B.

The ceria setter was prepared by mixing binder and ceria powder and placing the mixture in a square die. The powder was subsequently compressed under high pressure using a uniaxial press. The green setter was then fired above 1300° C. for several hours to provide for sintering of the ceria particles.

Two types of SFCM materials were fired on the bulk ceria setter in the fifth test. The SFCM materials were a nominally 5 cm by 5 cm partial cell laminates (size is referenced to the final fired size) made up of different tape cast layers. The first SFCM material included pore formers, while the second material had no pore former added. The ASL of the first and second SFCM materials was a composite comprising a mixture of SFCM and gadolinium-doped cerium oxide ($Ce_{0.9}Gd_{0.1}O_{1.95}$, GDC10) plus ~2 mol % $Co_3O_4$ (the GDC10 and $Co_3O_4$ collectively referred to as Co-GDC), where the SFCM had the composition $SrFe_{0.2}Co_{0.4}Mo_{0.4}O_3$ (SFCM244 or simply SFCM). For the first and second SFCM materials, the ASL had 67 wt % SFCM and 33 wt % GDC10 (due to relatively small amount of cobalt oxide, this is essentially Co-GDC).

For the first and second SFCM materials, the ASL tape cast slurry was prepared by mixing, in a ball mill, various powders and other additives, including SFCM, GDC10, PMMA microspheres (omitted for second SFCM material), cobalt oxide ($Co_3O_4$), binder, dispersant, and solvent. An electrolyte tape was prepared by mixing, in a ball mill, various powders and other additives, including GDC10, binder, dispersant, and solvent. The ASL tape thickness was around 200 μm to 250 μm and the electrolyte tape was about 20 microns thick. The ASL and electrolyte tapes were cut to size with a razor blade, stacked, and laminated into a partial cell green laminate using a heated uniaxial press.

The partial cell green laminate was placed on the top surface of the first ceria setter plate. The second ceria setter plate was placed on top of the partial cell green laminate. The second setter was sized with an overhang of up to approximately 1.5 mm on each side, and with a weight between 0.9 g/cm² and 1.2 g/cm², both defined relative to the partial cell green laminate dimensions. The entire assembly was then placed inside a high temperature kiln. The kiln temperature increased with at least a single burnout dwell around 400° C. for ~1 hour before the temperature was ramped to 1300° C., dwelled for approximately 4 hours, and was subsequently cooled to room temperature. None of the two SFCM materials stuck to the ceria setter.

In the sixth test, an alumina setter was coated with a mixture of gadolinium-doped cerium oxide ($Ce_{0.9}Gd_{0.1}O_{1.95}$, GDC10) and ~2 mol % $Co_3O_4$ (the GDC10 and $Co_3O_4$ collectively referred to as Co-GDC) and utilized to fire SFCM materials at a temperature of 1300° C. for four hours. Even after multiple firings of different SFCM materials, the fired cell materials were easily removed from the setter without cracking or fracture, resulting in cells resembling those depicted in FIGS. 7A and 7B.

The SFCM material was a nominally 5 cm by 5 cm partial cell laminate (size is referenced to the final fired size) made up of different tape cast layers. The ASL was a composite comprising a mixture of SFCM and gadolinium-doped cerium oxide ($Ce_{0.9}Gd_{0.1}O_{1.95}$, GDC10) plus ~2 mol % $Co_3O_4$ (the GDC10 and $Co_3O_4$ collectively referred to as Co-GDC), where the SFCM had the composition $SrFe_{0.2}Co_{0.4}Mo_{0.4}O_3$ (SFCM244 or simply SFCM). The ASL had 67 wt % SFCM and 33 wt % GDC10 (due to relatively small amount of cobalt oxide, this is essentially Co-GDC). The electrolyte comprised gadolinium-doped ceria and had the composition $Ce_{0.9}Gd_{0.1}O_{1.95}$ (GDC10).

An ASL tape cast slurry was prepared by mixing, in a ball mill, various powders and other additives, including SFCM, GDC10, PMMA microspheres, cobalt oxide ($Co_3O_4$), binder, dispersant, and solvent. An electrolyte tape was prepared by mixing, in a ball mill, various powders and other additives, including GDC10, binder, dispersant, and solvent. The ASL tape thickness was around 200 μm to 250 μm and the electrolyte tape was about 20 microns thick. The ASL and electrolyte tapes were cut to size with a razor blade, stacked, and laminated into a partial cell green laminate using a heated uniaxial press.

The first setter plate for the sixth test was prepared by coating a new (virgin) alumina setter with a slurry of $Co_3O_4$ and GDC. The slurry was prepared by mixing GDC, $Co_3O_4$, texanol-based vehicle, and ethanol on a ball mill and subsequently coating the setter with a roller. The film on the setter was then dried and fired at 1300° C. for 4 hours. The second setter plate was coated using the same technique. The second setter was sized with an overhang of up to approximately 1.5 mm on each side, and with a weight between 0.9 g/cm² and 1.2 g/cm², both defined relative to the partial cell green laminate dimensions. The partial cell green laminate was placed on the top surface of the first setter plate. The second setter plate was placed on top of the partial cell green laminate. The entire assembly was then placed inside a high temperature kiln. The kiln temperature increased with at least a single burnout dwell around 400° C. for ~1 hour before the temperature ramped to 1300° C., dwelled for approximately 4 hours, and was subsequently cooled to room temperature. The fired cell material was flat and did not stick to the setter plates.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A structure comprising:
    a layered structure comprising (i) a ceramic anode and (ii) a solid electrolyte layer disposed over the anode; and
    a first setter plate having a top surface (i) in contact with the anode and (ii) comprising ceria and/or doped ceria.

2. The structure of claim 1, wherein an areal dimension of the first setter plate is larger than an areal dimension of the layered structure.

3. The structure of claim 1, wherein the top surface of the first setter plate comprises ceria doped with Gd, Y, La, Pr, Sm, and/or Nd.

4. The structure of claim 1, wherein the first setter plate comprises a ceramic setter material coated with a layer of material different from the ceramic setter material.

5. The structure of claim 4, wherein the first setter plate comprises alumina coated with a layer of ceria or doped ceria.

6. The structure of claim 1, wherein the first setter plate is composed of ceria or doped ceria.

7. The structure of claim 1, wherein the top surface of the first setter plate further comprises, mixed with the ceria and/or doped ceria, one or more volatile species selected from the list consisting of Co, Mo, Ni, Cr, V, Bi, Li, Na, and Cu.

8. The structure of claim 1, further comprising, disposed on the layered structure, a second setter plate having a bottom surface comprising ceria and/or doped ceria.

9. The structure of claim 8, wherein the bottom surface of the second setter plate comprises ceria doped with Gd, Y, La, Pr, Sm, and/or Nd.

10. The structure of claim 8, wherein the second setter plate comprises a ceramic setter material coated with a layer of material different from the ceramic setter material.

11. The structure of claim 10, wherein the second setter plate comprises alumina coated with a layer of ceria or doped ceria.

12. The structure of claim 8, wherein the second setter plate is composed of ceria or doped ceria.

13. The structure of claim 8, wherein a weight of the second setter plate ranges between approximately 0.5 g/cm$^2$ and approximately 3 g/cm$^2$.

14. The structure of claim 8, wherein the bottom surface of the second setter plate further comprises, mixed with the ceria and/or doped ceria, one or more volatile species selected from the list consisting of Co, Mo, Ni, Cr, V, Bi, Li, Na, and Cu.

15. The structure of claim 1, further comprising a cathode layer disposed over the electrolyte layer.

16. The structure of claim 15, further comprising a cathode functional layer disposed between the cathode layer and the electrolyte layer.

17. The structure of claim 16, wherein the cathode functional layer comprises cobalt oxide mixed with at least one of gadolinium-doped ceria or samarium-doped ceria.

18. The structure of claim 15, wherein the cathode layer comprises a mixture of samarium strontium cobaltite and doped ceria.

19. The structure of claim 1, wherein an area of the layered structure is larger than 5 cm×5 cm, and the layered structure is free of cracks.

20. The structure of claim 1, wherein the anode comprises at least one of (i) a ceramic oxide material containing strontium, iron, cobalt, and molybdenum, (ii) vanadium- and sodium-doped strontium niobate, or (iii) vanadium-doped strontium titanate.

21. The structure of claim 1, wherein the anode comprises ceria or doped ceria.

22. The structure of claim 1, wherein the electrolyte layer comprises ceria doped with Gd, Y, La, Pr, Sm, and/or Nd.

23. The structure of claim 1, wherein the anode comprises (i) a ceramic anode support layer and (ii) a ceramic anode functional layer disposed over the anode support layer, the electrolyte layer being disposed over the anode functional layer.

* * * * *